US012060166B2

(12) United States Patent
Weisfelner et al.

(10) Patent No.: US 12,060,166 B2
(45) Date of Patent: Aug. 13, 2024

(54) CARGO-RESTRAINING DEVICES AND CARGO HANDLING SYSTEMS INCLUDING THE SAME

(71) Applicant: The Boeing Company, Chicago, IL (US)

(72) Inventors: Justin Weisfelner, Long Beach, CA (US); Dale M. Adams, Redmond, WA (US); Bo Stefan Ostberg, Lynnwood, WA (US)

(73) Assignee: THE BOEING COMPANY, Arlington, VA (US)

( * ) Notice: Subject to any disclaimer, the term of this patent is extended or adjusted under 35 U.S.C. 154(b) by 231 days.

(21) Appl. No.: 17/530,104

(22) Filed: Nov. 18, 2021

(65) Prior Publication Data
US 2022/0234737 A1    Jul. 28, 2022

Related U.S. Application Data

(60) Provisional application No. 63/140,426, filed on Jan. 22, 2021.

(51) Int. Cl.
*B64D 9/00*        (2006.01)
(52) U.S. Cl.
CPC .................. *B64D 9/003* (2013.01)
(58) Field of Classification Search
CPC ...................................... B64D 9/003
See application file for complete search history.

(56) References Cited

U.S. PATENT DOCUMENTS

| | | | |
|---|---|---|---|
| 3,377,040 A | 4/1968 | Hansen | |
| 3,698,679 A | 10/1972 | Lang et al. | |
| 3,741,504 A | 6/1973 | Alberti et al. | |
| 3,741,508 A | 6/1973 | Alberti | |
| 4,456,207 A * | 6/1984 | Engel .................... | B64D 9/003 414/498 |
| 6,039,519 A * | 3/2000 | Jones ...................... | B64D 9/00 410/80 |
| 6,425,717 B1 | 7/2002 | Saggio et al. | |
| 6,450,744 B1 | 9/2002 | Gilhuys et al. | |
| 8,496,205 B2 * | 7/2013 | Moradians ............. | B64D 9/003 244/137.1 |
| 8,500,379 B2 | 8/2013 | Harrigan et al. | |
| 8,668,417 B2 | 3/2014 | Harrigan et al. | |

(Continued)

*Primary Examiner* — Christopher D Hutchens
(74) *Attorney, Agent, or Firm* — Kolitch Romano Dascenzo Gates LLC

(57) ABSTRACT

Cargo-restraining devices and cargo handling systems. The cargo-restraining devices include a body comprising a protrusion and defining a slot extending at least partially through the body transverse to the protrusion. The slot is configured to slidingly receive an axle of an axle assembly that is configured to couple the cargo-restraining device to a guide rail. The cargo-restraining devices also include a torsional biasing mechanism engaged with the body and configured to engage the axle assembly to bias the body toward a default pivotal position, and a linear biasing mechanism engaged with the body and configured to engage the axle to bias the body toward a default deflection. The cargo handling systems include a first guide rail, a second guide rail, and a plurality of cargo-restraining devices, which include a first subset coupled to the first guide rail and a second subset coupled to the second guide rail.

20 Claims, 8 Drawing Sheets

(56) References Cited

U.S. PATENT DOCUMENTS

| | | |
|---|---|---|
| 10,391,921 B2 | 8/2019 | Kismarton et al. |
| 11,130,574 B2 | 9/2021 | DeVerter et al. |
| 2010/0209209 A1* | 8/2010 | Schulze ................ B64D 9/003 410/80 |
| 2013/0168494 A1* | 7/2013 | Moradians ............ B64D 9/003 244/118.1 |
| 2019/0301899 A1 | 10/2019 | Clos et al. |
| 2019/0375327 A1 | 12/2019 | Kismarton et al. |
| 2020/0255150 A1 | 8/2020 | DeVerter et al. |

* cited by examiner

CARGO-RESTRAINING DEVICES AND CARGO HANDLING SYSTEMS INCLUDING THE SAME

RELATED APPLICATION

The present application is a non-provisional of and claims priority to U.S. Provisional Patent Application No. 63/140,426, filed on Jan. 22, 2021, entitled "CARGO-RESTRAINING DEVICES AND CARGO HANDLING SYSTEMS INCLUDING THE SAME," the complete disclosure of which is incorporated by reference.

FIELD

The present disclosure relates to cargo-restraining devices and cargo handling systems including the same.

BACKGROUND

Aircraft often include a cargo handling system that is configured to secure cargo or cargo-supporting structures within a stowage region of the aircraft and prevent excessive movement of the cargo during transport. Typically, cargo handling systems also are configured to facilitate loading of the cargo to within the stowage region and unloading of the cargo from within the stowage region. Most cargo handling systems include vertical restraints, which conventionally are flipper-type devices that extend over a peripheral region of cargo-supporting structures to restrict vertical movement thereof. Traditional vertical restraints often are configured to rotate on a vertical axis to allow cargo to pass by during loading and unloading. Some cargo-supporting structures, such as cargo pallets, include protruding structures that directly contact the vertical restraints during loading and unloading and cause the flippers to rotate about the vertical axis. Traditionally, vertical restraints are supplied with a spring that restores the flipper back to the restraint direction after the protruding feature has released the flipper. However, if the protruding feature that engages the vertical restraint is worn, or if the spring over-rotates the flipper after it is released by the protruding structure, the flipper may be ill-positioned and unable to rotate when contacted by a subsequent protruding structure. In some situations, this will cause a jam where the flipper can entirely stop the motion of the cargo-supporting structure and potentially cause damage to the cargo handling system. Thus, a need exists for improved vertical restraints which may prevent or avoid jams with cargo or cargo-supporting structures such as during loading or unloading operations.

SUMMARY

Cargo-restraining devices and cargo handling systems are disclosed herein. The cargo-restraining devices include a body comprising a protrusion and defining a slot extending at least partially through the body transverse to the protrusion. The slot is configured to slidingly receive an axle of an axle assembly and constrain linear displacement of the body relative to the axle. The axle assembly is configured to operatively couple the cargo-restraining device to a guide rail of a cargo handling system. The cargo-restraining devices also include a torsional biasing mechanism operatively engaged with the body and configured to engage with the axle assembly to bias the body toward a default pivotal position relative to the axle, and a linear biasing mechanism engaged with the body and configured to engage with the axle to bias the body toward a default deflection relative to the axle. The cargo handling systems include a cargo guide assembly comprising a first guide rail and a second guide rail extending at least substantially parallel to one another along a longitudinal axis and laterally spaced apart from one another with a lateral rail spacing extending therebetween. The cargo handling systems also includes a plurality of cargo-restraining devices, which includes a first subset of cargo-restraining devices that are operatively coupled to the first guide rail and a second subset of cargo-restraining devices that are operatively coupled to the second guide rail. In the default pivotal position, the protrusion of each of the first subset and the second subset of the plurality of cargo-restraining devices extends transverse to the longitudinal axis and into the lateral rail spacing.

DESCRIPTION

Figure 1:
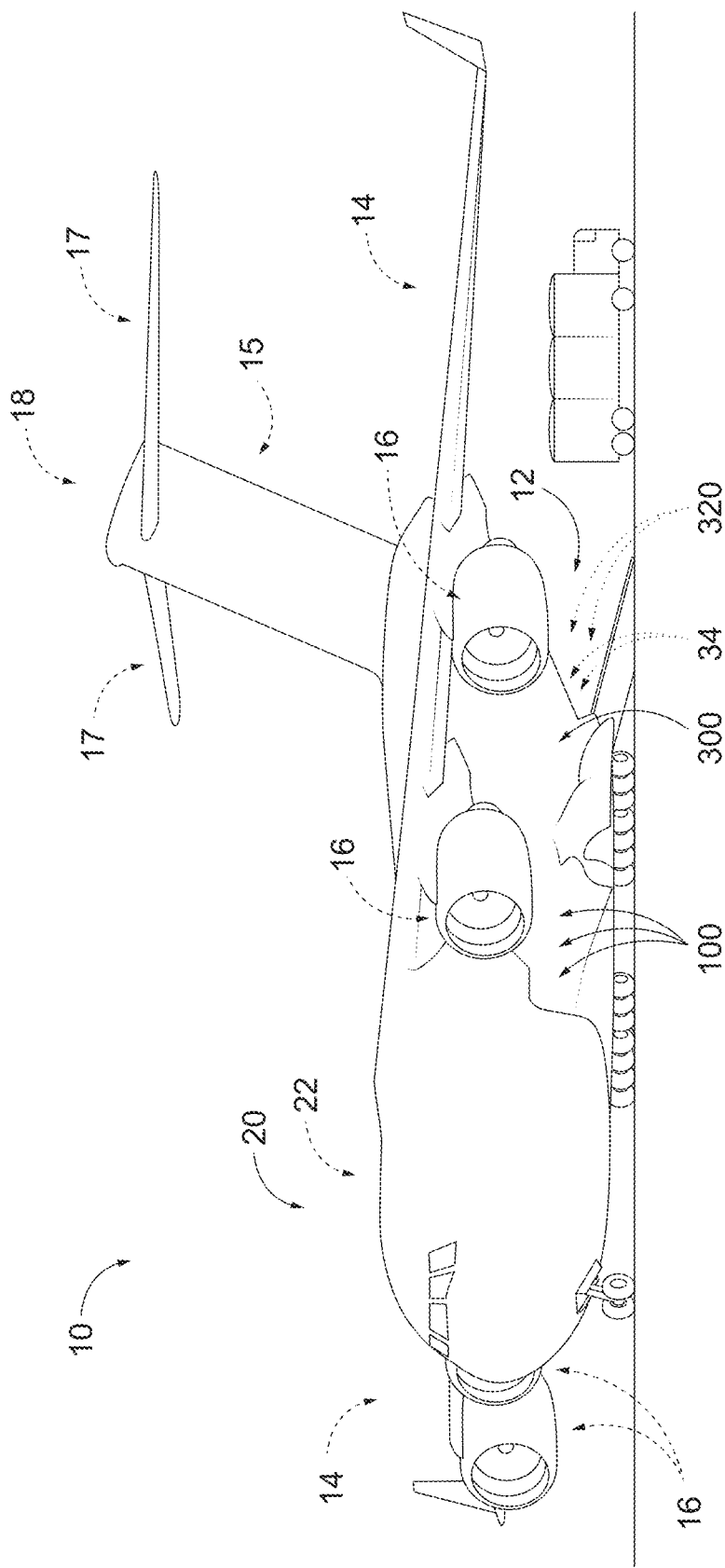
FIG. 1 is a schematic representation of an aircraft that includes a plurality of cargo-restraining devices according to the present disclosure.

FIGS. 1-8 provide examples of cargo-restraining devices 100, cargo handling systems 300 including cargo-restraining devices 100, and aircraft 10 including cargo-restraining devices 100 and/or cargo handling systems 300 having cargo-restraining devices 100 according to the present disclosure. Elements that serve a similar or at least substantially similar purpose are labeled with like numbers in each of FIGS. 1-8, and these elements may not be discussed in detail here with reference to each of FIGS. 1-8. Similarly, all elements may not be labeled in each of FIGS. 1-8, but reference numerals associated therewith may be utilized herein for consistency. Elements, components, and/or features that are discussed herein with reference to any of FIGS. 1-8 may be included in and/or utilized with any of FIGS. 1-8 without departing from the scope of the present disclosure.

Generally, in the figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure. In the figures, dotted lines may be utilized to indicate structures or elements that are environment to cargo-restraining devices 100 and/or cargo handling systems 300 and/or structures or elements that cargo-restraining devices 100 and/or cargo handling systems 300 are configured to handle. Also in the figures, dot-dash lines may be utilized to indicate various orientations and/or axes.

FIG. 1 illustrates examples of aircraft 10 that include and/or cargo handling systems 300 having cargo-restraining devices 100. Examples of cargo-restraining devices 100 and cargo handling systems 300 are illustrated in FIGS. 2-7 and discussed in more detail herein with reference thereto.

Aircraft 10 may include a fuselage 20 and at least one wing 14 operatively attached to and/or extending from fuselage 20. Aircraft 10 also may include at least one engine 16 that is operatively attached to fuselage 20, such as via a corresponding wing 14. In some examples, aircraft 10 further includes a tail assembly 18 that is operatively attached to and/or at least partially defied by fuselage 20. In some such examples, tail assembly 18 includes at least one vertical stabilizer 15 and at least one horizontal stabilizer 17. In some examples, aircraft 10 includes at least one cargo bay, hold, storage region, and/or cargo cabin 12 within fuselage 20 that is configured to receive and/or transport at least one transport structure 320. As discussed in more detail herein, transport structure 320 includes, supports, or is at least one item of cargo 34. In some examples, cargo cabin 12 is configured to receive and/or transport a plurality of transport structures 320.

Aircraft 10 further includes a plurality of cargo-restraining devices 100 configured to restrict vertical movement of cargo within aircraft 10. In some examples, cargo-restraining devices 100 are operably coupled to a cabin floor 24 of cargo cabin 12. In some examples, aircraft 10 includes at least one cargo handling system 300 that is configured to guide at least one transport structure 320 to a desired position within fuselage 20 while restraining vertical and lateral movement of the at least one transport structure 320. In some examples, cargo handling system 300 is configured to selectively secure the at least one transport structure 320 in the desired location within fuselage 20, such as during flight or taxiing. In some examples, cargo handling system 300 is configured to guide a plurality of transport structures 320 to a plurality of desired locations within the fuselage while restraining vertical and lateral movement thereof. In some such examples, cargo handling system 300 is configured to selectively secure the plurality of transport structures 320 in the plurality of desired locations. Cargo handling system 300 may be configured to guide translation of transport structure(s) 320 to within fuselage 20, such as during loading operations, and/or guide translation of transport structure(s) 320 from within fuselage 20, such as during unloading operations.

Cargo handling system 300 includes at least some of the cargo-restraining devices 100. In some examples, each cargo handling system 300 is included in or defines a portion of cargo cabin 12. In particular, cargo cabin 12 may define cabin floor 24, and cargo handling system 300 may be disposed along and/or define at least a portion of cabin floor 24. In some examples, aircraft 10 includes a plurality of cargo handling systems 300. In some such examples, two or more cargo handling systems 300 are included in cargo cabin 12 and/or in a plurality of cargo cabins 12. Additionally or alternatively, aircraft 10 may include a plurality of cargo handling systems 300 disposed within various other locations of fuselage 20. Aircraft 10 also may include a plurality of cargo-restraining devices 100 that are separate from any cargo handling system 300.

Aircraft 10 include any suitable type of aircraft, with examples including private aircraft, commercial aircraft, passenger aircraft, military aircraft, jetliners, an autonomous aircraft, wide-body aircraft, and/or narrow body aircraft. While FIG. 1 illustrates examples in which aircraft 10 is a fixed wing aircraft, cargo-restraining devices 100 and/or cargo handling systems 300 may be included in and/or utilized with any suitable type of aircraft with illustrative non-exclusive examples of other types of aircraft including rotorcraft, helicopters, tiltwing aircraft, tiltrotor aircraft, rockets, rocket propulsion systems, and/or spacecraft. Cargo-restraining devices 100 and/or cargo handling systems 300 also are not limited to aviation and may be included in and/or utilized in various ground transportation vehicles and/or various nautical vehicles.

Figure 2:
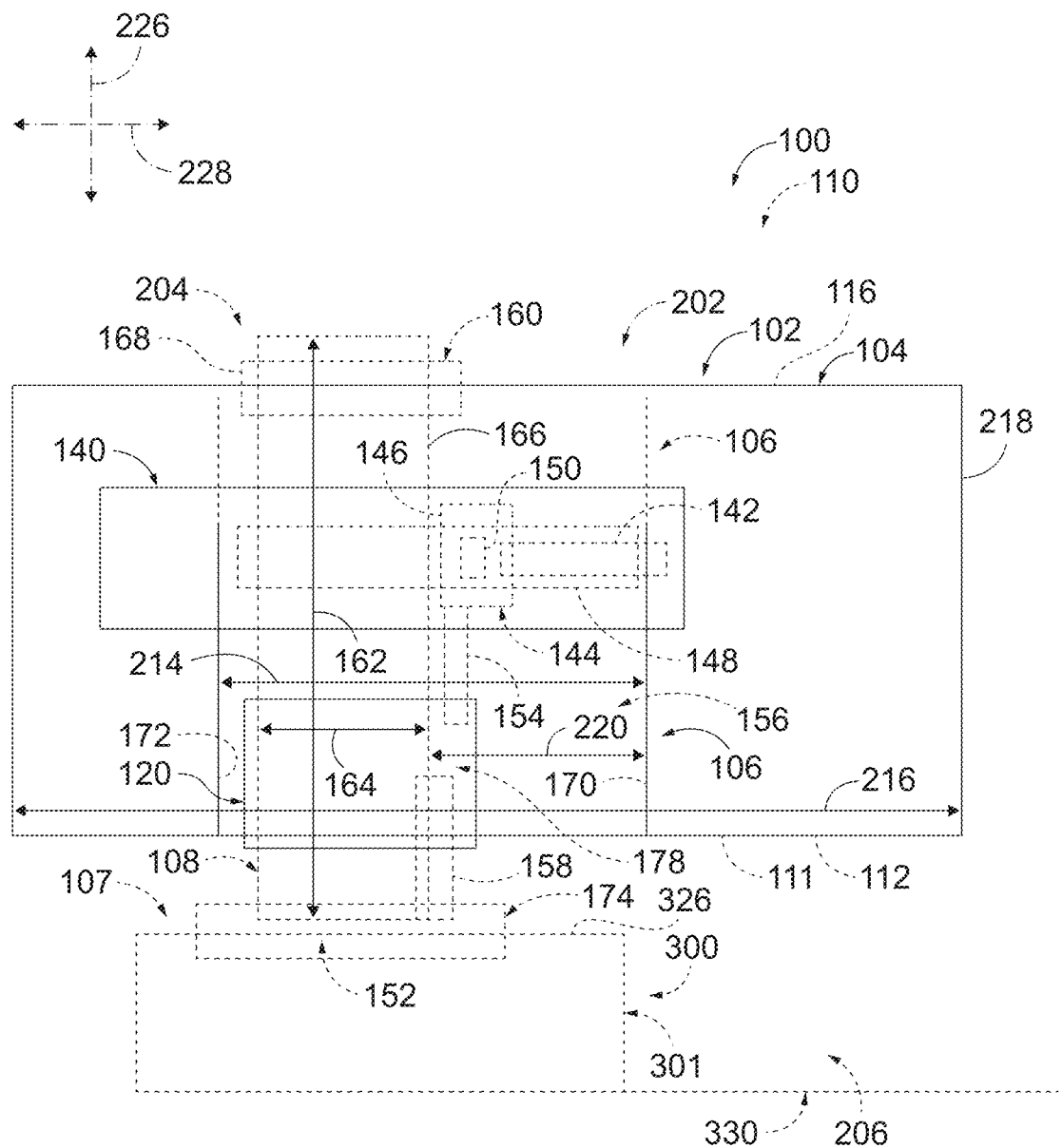
FIG. 2 is a schematic representation of cargo-restraining devices according to the present disclosure.
Figure 3:
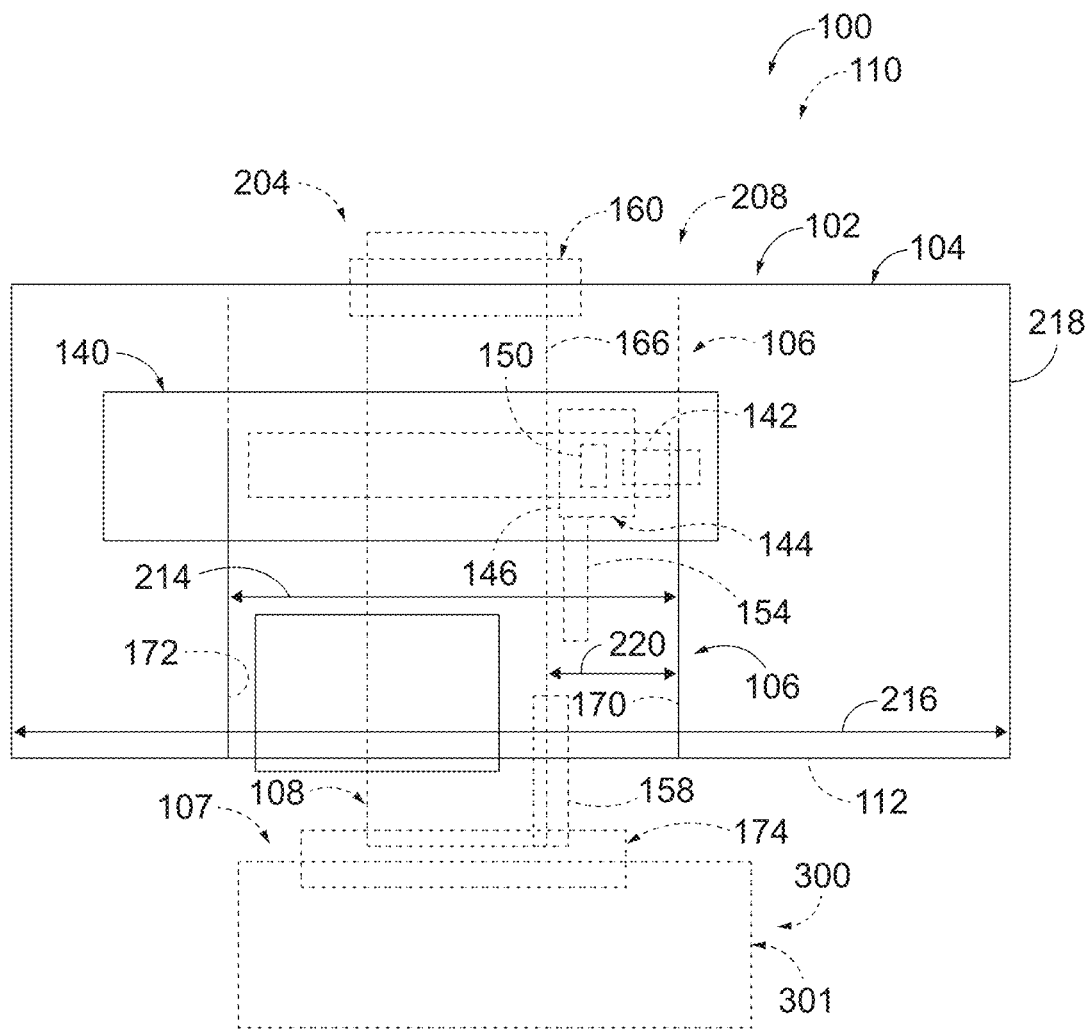
FIG. 3 is a schematic representation of the cargo-restraining devices of FIG. 2 deflected from a default deflection.
Figure 4:
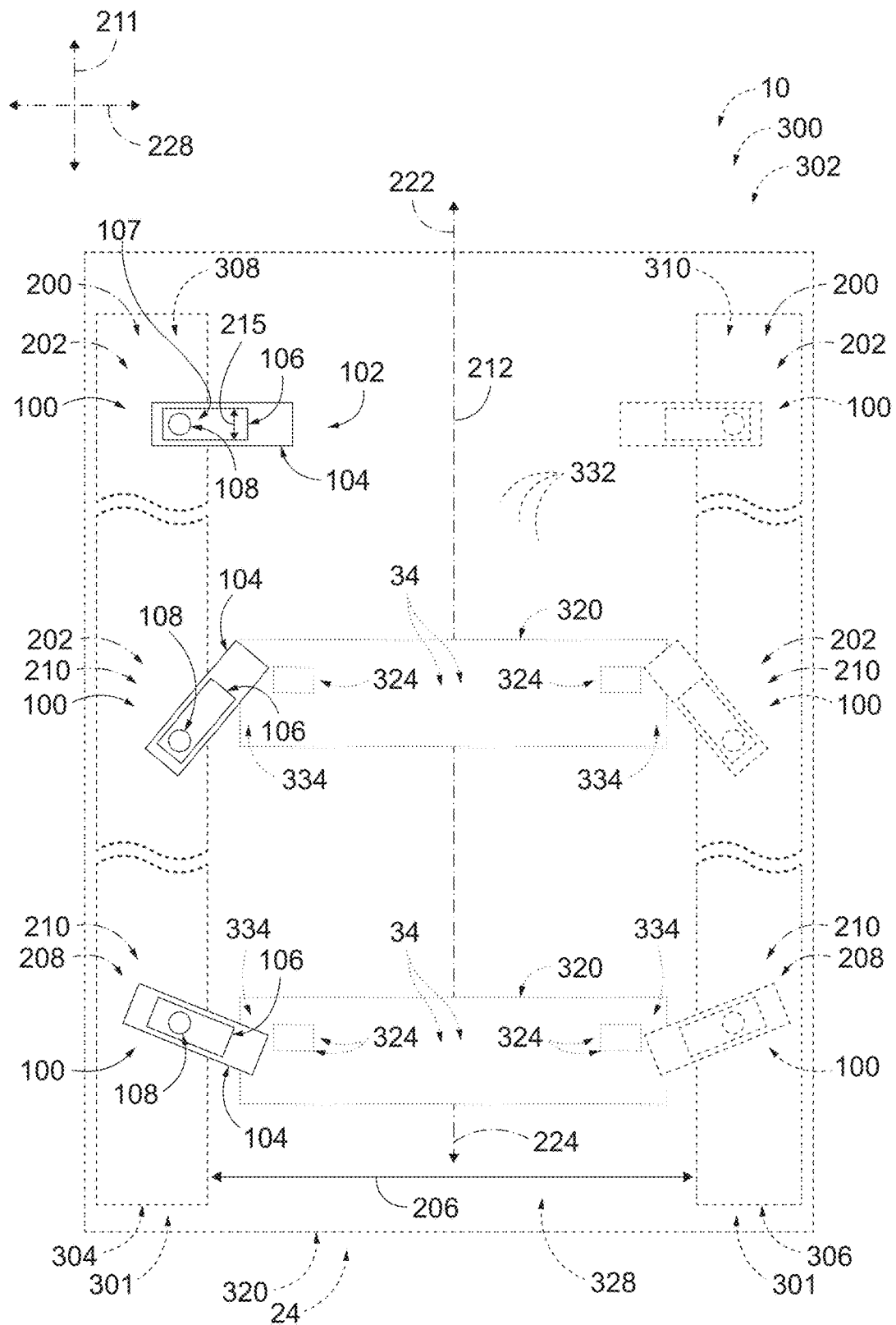
FIG. 4 is a schematic representation of cargo-restraining devices in various pivotal and linear deflections and of cargo handling systems that include a plurality of cargo-restraining devices according to the present disclosure.

FIG. 2 is a schematic side view representing examples of cargo-restraining devices 100 according to the present disclosure. FIG. 3 is a side view of the examples of cargo-restraining devices 100 shown in FIG. 2 deflected from a default deflection 202 shown in FIG. 2. FIG. 4 is a plan view illustrating cargo-restraining devices 100 operably positioned in various deflections and pivotal positions. As shown in FIGS. 2-4, cargo-restraining devices 100 include a body 102 comprising a protrusion 104 and defining a slot 106 that extends at least partially through body 102 transverse to protrusion 104. Slot 106 is configured to slidingly receive an axle 108 of an axle assembly 107 and constrain linear displacement of body 102 relative to axle 108. Cargo-restraining devices 100 also include a torsional biasing mechanism 120 that is operably engaged with body 102 and configured to engage with axle assembly 107 to bias body 102 towards a default pivotal position 200 relative to axle 108. Cargo-restraining devices 100 further include a linear biasing mechanism 140 that is engaged with body 102 and configured to engage with axle 108 to bias body 102 towards a default deflection 202 relative to axle 108. Axle assembly 107 is configured to operatively couple cargo-restraining device 100 to a guide rail 301 of a cargo handling system 300. As discussed in more detail herein, in some examples, cargo-restraining devices 100 include axle assembly 107 and/or axle 108. In other examples, axle assembly 107 and/or axle 108 are included in and/or define a portion of an existing cargo handling system 300, and cargo-restraining devices 100 are configured to receive and operate with an existing axle assembly 107 and/or an existing axle 108.

In some examples, cargo-restraining devices 100 are configured to restrain vertical movement of one or more transport structures 320 positioned within and/or translating through cargo handling system 300. In such examples, cargo-restraining device 100 may be referred to as a vertical-restraining device 110. As discussed in more detail herein, cargo handling systems 300 are configured to guide longitudinal translation of one or more transport structures 320 through and/or within a guiding region 328 defined by one or more guide rails 301. As shown in FIG. 4, when cargo-restraining device 100 is operably coupled to guide rail 301, protrusion 104 of body 102 extends laterally over or within guiding region 328. In this position, protrusion 104 is configured to selectively engage a portion of transport structure 320 to restrict vertical movement thereof. Cargo-restraining devices 100 also are configured to permit longitudinal translation of transport structure 320 within guiding region 328. In particular, protrusion 104 may be positioned to slidingly engage transport structure 320 and/or may be positioned to operatively engage transport structure 320 only during vertical movement of transport structure 320.

In some examples, transport structure 320 includes a vertically-protruding feature 324 that is positioned along transport structure 320 such that vertically-protruding feature 324 collides with or contacts protrusion 104 during longitudinal translation of transport structure 320 within guiding region 328. In view of the above, cargo-restraining devices 100 may be configured to pivot from default pivotal position 200 and/or deflect from default deflection 202 when protrusion 104 is engaged by vertically-protruding feature 324 during longitudinal translation of transport structure 320. In this way, cargo-restraining device 100 may be described as releasing vertically-protruding feature 324 to permit transport structure 320 to continue to translate along guiding region 328.

In some examples, linear biasing mechanism 140 is configured to permit body 102 of cargo-restraining devices 100 to deflect from default deflection 202. With reference to FIG. 2, slot 106 defines a slot length 214, and body 102 defines an outermost length 216 that may be at least substantially aligned with slot length 214. In some examples, slot 106 is dimensioned such that slot length 214 is larger than an axle diameter 164 of axle 108. In this way, body 102 is configured to slidingly translate along slot 106 relative to axle 108. As examples, slot length 214 may be selected to be at least 105%, at least 110%, at least 120%, at least 140%, at least 150%, at least 170%, at least 180%, at least 200%, at most 120%, at most 140%, at most 150%, at most 170%, at most 180%, at most 200%, at most 300%, and/or at most 1000% the magnitude of axle diameter 164. Further shown in FIG. 2, slot length 214 extends between a first end region 170 of slot 106 that positioned nearest an outermost extent 218 of protrusion 104 and a second end region 172 of slot 106 that is positioned furthest from outermost extent 218 of protrusion 104. In some examples, linear biasing mechanism 140 supports body 102 with first end region 170 of slot 106 spaced apart from an exterior surface 166 of axle 108 by a linear separation 220. As defined herein, linear separation 220 may include the shortest distance between first end region 170 of slot 106 and a point on exterior surface 166 of axle 108.

In some examples, linear biasing mechanism 140 urges axle 108 against second end region 172 of slot 106 to position body 102 in default deflection 202. In some examples, linear biasing mechanism 140 is configured to permit body 102 to deflect from default deflection 202 to among a plurality of releasing deflections 208. More specifically, as shown in the sequence between FIGS. 2-3, linear biasing mechanism 140 may position body 102 with a maximum linear separation 220 in default deflection 202. In some examples, linear biasing mechanism 140 permits body 102 to deflect relative to axle 108 towards smaller linear separations 220 such that body 102 is positioned with a smaller linear separation 220 when body 102 is among the plurality of releasing deflections 208. In this way, outermost extent 218 of protrusion 104 is positioned furthest from axle 108 when body 102 is in default deflection 202 and moves towards axle 108 when body 102 deflects to among the plurality of releasing deflections 208. In some examples, each releasing deflection 208 corresponds to body 102 being positioned with a corresponding linear separation 220 relative to axle 108.

In some examples, linear biasing mechanism 140 is configured to apply a restoring force between body 102 and axle 108 to bias body 102 towards default deflection 202 and/or to urge body 102 towards default deflection 202 when body 102 is deflected from default deflection 202 and/or is among the plurality of releasing deflections 208. In some examples, linear biasing mechanism 140 comprises a linear restoring mechanism 142 that is configured to apply the restoring force to urge and/or bias body 102 towards default deflection 202. In some examples, the restoring force applied by linear restoring mechanism 142 increases with decreasing linear separation 220.

In some examples, linear restoring mechanism 142 is configured to apply an outward restoring force to urge body 102 towards default deflection 202. In some such examples, linear restoring mechanism 142 is configured to apply the outward restoring force between first end region 170 of slot 106 and axle 108 to resist deflection of first end region 170 of slot 106 towards axle 108 and/or to urge first end region 170 of slot 106 outwardly from axle 108 when body 102 is among releasing deflections 208. In some such examples, at least a portion of linear restoring mechanism 142 is positioned between first end region 170 of slot 106 and axle 108 when axle 108 is received in slot 106. In other examples, linear biasing mechanism 140 is configured to apply an inward or contracting restoring force to urge body 102 towards default deflection 202. In some such examples, linear biasing mechanism 140 is configured to apply the inward or contracting force between second end region 172 of slot 106 and axle 108 when axle 108 is received in slot 106. In some such examples, at least a portion of linear restoring mechanism 142 is positioned between second end region 172 of slot 106 and axle 108.

Linear restoring mechanism 142 comprises any suitable mechanism, and/or material for applying the restoring force. Examples of suitable linear restoring mechanisms 142 include a spring, a coil spring, a helical spring, a gas spring, a hydraulic spring, a pneumatic spring, a piston, a hydraulic piston, a pneumatic piston, a resilient body, and/or an elastic body. As more specific examples, when linear restoring mechanism 142 is configured to apply an outward restoring force, linear restoring mechanism 142 may include a compression spring and/or an elastically compressible material. When linear restoring mechanism 142 is configured to apply an inward restoring force, linear restoring mechanism 142 may include an extension spring, a tension spring, a tension gas spring, and/or an elastically elongating material.

In some examples, linear biasing mechanism 140 is configured to restrict deflection of body 102 beyond a maximum threshold linear deflection. Stated differently, in some examples, linear biasing mechanism 140 is configured to permit linear deflection of body 102 up to the maximum threshold linear deflection. In some examples, the maximum linear deflection is a threshold fraction of slot length 214, with examples of the threshold fraction including at least 5%, at least 10%, at least 20%, at least 30%, at least 40%, at least 50%, at least 60%, at least 70%, at most 90%, at most 80%, at most 70%, at most 60%, at most 50%, at most 40%, at most 30%, at most 20%, at most 10% and/or at most 5%.

Linear biasing mechanism 140 is disposed in and/or along any suitable portion or region of cargo-restraining device 100. In some examples, at least a portion of, or the entirety of, linear biasing mechanism 140 is disposed within slot 106. In some such examples, linear biasing mechanism 140 extends from or is operably coupled to a sidewall 156 defined by slot 106. As an example, for some examples in which linear restoring mechanism 142 is configured to apply an outward restoring force, linear restoring mechanism 142 is operably coupled to and/or extends from first end region 170 of slot 106. Similarly, for some examples in which linear restoring mechanism 142 is configured to apply an inward restoring force, linear biasing mechanism 140 is operably coupled to and/or extends from second end region 172 of slot 106.

Linear biasing mechanism 140 is configured to operatively engage axle 108 in any suitable manner. As shown in FIG. 2, in some examples, linear biasing mechanism 140 comprises an axle-contacting member 144 that is configured to operatively engage axle 108 when axle 108 is received in slot 106. In some examples, axle-contacting member 144 is operatively coupled to linear restoring mechanism 142 to be positioned between linear restoring mechanism 142 and axle 108 when axle 108 is received in slot 106. In some examples, linear biasing mechanism 140 is configured to pivot with body 102 about axle 108. In particular, in some examples, axle-contacting member 144 is configured to pivotally or slidingly engage axle 108 to permit and/or guide pivot movement of body 102 about axle 108.

In some examples, axle-contacting member 144 comprises an axle-contacting region 146 that is dimensioned and shaped to correspond to a region of exterior surface 166 of axle 108. For example, when axle 108 comprises a cylindrical shape, or exterior surface 166 of axle 108 is cylindrical, axle-contacting region 146 may include a semi-cylindrical recess or channel that is dimensioned and shaped in correspondence with the cylindrical shape of exterior surface 166. In some such examples, the cylindrical recess or channel defines a bearing surface that is configured to slide circumferentially about exterior surface 166 to permit and/or guide pivotal movement of body 102 about axle 108. As another example, axle-contacting region 146 may include a ring and/or a rotary bearing that is configured to receive axle 108 and permit and/or guide pivotal movement of body 102 about axle 108.

In some examples, linear restoring mechanism 142 urges axle-contacting member 144 in contact with exterior surface of axle 108 when axle 108 is received in slot 106. In this way, axle-contacting member 144 may be in contact with axle 108 when body 102 is in default deflection 202 and when body 102 is among the plurality of releasing deflections 208. Stated differently, in some examples, linear restoring mechanism 142 is configured to permit body 102 to deflect relative to axle-contacting member 144.

In some examples, axle-contacting member 144 is configured to guide linear displacement of body 102 relative to axle 108. As shown in FIG. 2, in some examples, body 102 includes at least one linear guide 148 disposed within slot 106 and extending at least substantially parallel to slot length 214. Axle-contacting member 144 may include at least one corresponding guide-contacting member 150 that is slidably engaged with linear guide 148. In such examples, linear guide 148 and guide-contacting member 150 are configured to cooperatively constrain linear displacement of body 102 relative to axle 108. In some examples, body 102 includes a pair of linear guides 148 disposed along opposing sidewalls 156 of slot 106 and axle-contacting member 144 includes a correspond pair of guide-contacting members 150 that are positioned along axle-contacting member 144 to slidingly engage the pair of linear guides 148. As a more specific example, linear guide 148 may include a recessed track that extends from first end region 170 of slot 106 along at least a substantial portion of slot length 214 towards second end region 172 of slot 106, and guide-contacting member 150 may include a correspondingly-shaped protrusion that extends from axle-contacting member 144 to slidingly engage linear guide 148.

In some examples, torsional biasing mechanism 120 is configured to permit body 102 to pivot about axle 108 from default pivotal position 200 to among a plurality of pivotal releasing positions 210. In such examples, torsional biasing mechanism 120 is configured to permit body 102 to pivot in any suitable pivotal direction such as a clockwise direction, a counterclockwise direction, or in both clockwise and counterclockwise directions. In such examples, torsional biasing mechanism 120 is configured to permit body 102 to pivot through any suitable pivotal angle in the clockwise direction and/or the counterclockwise direction. As discussed herein, the pivotal angle is as defined relative to default pivotal position 200, in which body 102 is positioned with a pivotal angle of 0 degrees (°). Stated differently, each pivotal releasing position 210 may include body 102 being pivoted to any suitable pivotal angle relative to default pivotal position 200. Examples of suitable pivotal angles include at least 5°, at least 10°, at least 20°, at least 25°, at least 30°, at least 40°, at least 50°, at least 90°, at most 40°, at most 50°, at most 60°, at most 70°, at most 80°, at most 90°, at most 100°, and/or at most 180°.

In some examples, torsional biasing mechanism 120 is configured to apply a torsional restoring force between body 102 and axle assembly 107 to urge body 102 towards default pivotal position 200 when body 102 is pivoted among the plurality of pivotal releasing positions 210. In some examples, the restoring force applied by torsional biasing mechanism 120 increases with respect to the pivotal angle. In some examples, torsional biasing mechanism 120 also is configured to restrict body 102 from pivoting beyond a threshold maximum pivotal angle relative to default pivotal position 200, with examples of the threshold maximum pivotal displacement at most 50°, at most 60°, at most 70°, at most 80°, at most 90°, and/or at most 100°.

Torsional biasing mechanism 120 is configured to engage with axle assembly 107 in any suitable manner. With reference to FIGS. 2-3, in some examples, axle assembly 107 comprises a torsional biasing mechanism-engaging member 158 that torsional biasing mechanism 120 engages when axle 108 is received in slot 106. In some examples, torsional biasing mechanism-engaging member 158 is configured to restrict torsional biasing mechanism 120 from slidingly or freely pivoting about axle 108.

When included, torsional biasing mechanism-engaging member 158 is disposed along any suitable location of axle assembly 107. In some examples, torsional biasing mechanism-engaging member 158 is disposed along and/or extends from axle 108. Additionally or alternatively, in some examples, torsional biasing mechanism-engaging member 158 is disposed along and/or extends from an axle base 174 that is operably coupled to and configured to position axle 108. Examples of torsional biasing mechanism-engaging members 158 include a ridge and/or a raised rail extending along at least a portion of exterior surface 166 and at least partially aligned with an axle height 162. Additional or alternative examples of torsional biasing mechanism-engaging members 158 include a protrusion and/or a tab extending from axle base 174.

Torsional biasing mechanism 120 is operably engaged with body 102 in any suitable manner. Torsional biasing mechanism 120 may be operably engaged with body 102 in a manner that permits linear deflection of body 102 relative to axle 108. In some examples, torsional biasing mechanism 120 is operably engaged with body 102 through linear biasing mechanism 140. As discussed herein, in some examples, linear biasing mechanism 140 comprises axle-contacting member 144 that is configured to pivotally engage axle 108 and permit linear biasing mechanism 140 and body 102 to pivot about axle 108. In some such examples, torsional biasing mechanism 120 is engaged with axle-contacting member 144 and is configured to urge body 102 towards default pivotal position 200 by applying a torsional restoring force between axle assembly 107 and axle-contacting member 144. More specifically, in some examples, axle-contacting member 144 comprises a pivotal engaging member 154 that operatively engages torsional biasing mechanism 120. In such examples, torsional biasing mechanism 120 urges body 102 towards default pivotal position 200 by engaging pivotal engaging member 154. Examples of suitable pivotal engaging members 154 include a tab, a protrusion, and/or a toe that extends from axle-contacting region 146 to contact torsional biasing mechanism 120.

As a more specific example, torsional biasing mechanism 120 may include a C-spring that is dimensioned and shaped to extend circumferentially around at least a substantial portion of the circumference of axle 108. In such examples, torsional biasing mechanism 120 defines a gap 182 between two ends of the C-spring, and gap 182 is configured to receive at least a portion of pivotal engaging member 154 of linear biasing mechanism 140 and at least a portion of torsional biasing mechanism-engaging member 158 of axle assembly 107. In such examples, pivotal engaging member 154 is configured to apply torque to torsional biasing mechanism 120 when body 102 pivots from default pivotal position 200, and torsional biasing mechanism-engaging member 158 restricts pivotal movement of torsional biasing mechanism 120 about axle 108. In this way, torsional biasing mechanism 120 applies a torsional restoring force between torsional biasing mechanism-engaging member 158 and pivotal engaging member 154 responsive to the torque applied by pivotal engaging member 154. In some such examples, pivotal engaging member 154 and torsional biasing mechanism-engaging member 158 are vertically staggered within gap 182 and/or non-engaging with one another.

Torsional biasing mechanism 120 is disposed along and/or within any suitable location of cargo-restraining device 100. In some examples, torsional biasing mechanism 120 is at least partially or completely disposed within slot 106. In some examples, torsional biasing mechanism 120 extends around at least a portion of and/or a least a substantial portion of the circumference of axle 108. Torsional biasing mechanism 120 includes any suitable mechanism, structure, material, and/or combination thereof for biasing body 102 towards default pivotal position 200. Examples of suitable torsional biasing mechanisms 120 include a torsion spring, a c-spring, a helical torsion spring, a canted coil spring, a torsion bar, and/or a resilient member. In some examples, axle 108 comprises torsional biasing mechanism-engaging member 158 and torsional biasing mechanism 120 is configured to engage with torsional biasing mechanism-engaging member 158 to apply the torsional restoring force. In some examples, torsional biasing mechanism-engaging member 158 extends along at least portion of axle height 162 of axle 108.

As shown in FIG. 4, in some examples, cargo-restraining devices 100 are configured to permit body 102 to be deflected from default deflection 202 and simultaneously pivoted from default pivotal position 200. Stated differently, in some examples, cargo-restraining devices 100 are configured to permit body 102 to be among the plurality of releasing deflections 208 and simultaneously among the plurality of pivotal releasing positions 210.

In some examples, linear biasing mechanism 140 is configured to apply the restoring force between body 102 and axle 108 when body 102 is in default pivotal position 200 and when body 102 is pivoted from the default pivotal position 200 and among the plurality of pivotal releasing positions 210. In particular, as discussed herein, in some examples, linear biasing mechanism 140 is pivotally engaged with axle 108 and configured to pivot with body 102 about axle 108, such that linear biasing mechanism 140 may apply the restoring force when body 102 is pivoted to any suitable pivotal angle about axle 108.

Likewise, in some examples, torsional biasing mechanism 120 is configured to apply the torsional restoring force when body 102 is in default deflection 202 and when body 102 is deflected from default deflection 202 and among the plurality of releasing deflections 208. As discussed herein, in some examples, torsional biasing mechanism 120 operably engages body 102 through axle-contacting member 144 of linear biasing mechanism 140. In some such examples, axle-contacting member 144 slidingly engages body 102 such that axle-contacting member 144 operably contacts with axle 108 when body 102 is in default deflection 202 and when body 102 is among the plurality of releasing deflections 208. In this way, torsional biasing mechanism 120 may be operably engaged with body 102 through axle-contacting member 144 when body 102 is in default deflection 202 and among the plurality of releasing deflections 208 such that torsional biasing mechanism 120 may apply the torsional restoring force between body 102 and axle assembly 107 when body 102 is in default deflection 202 and when body 102 is among the plurality of releasing deflections 208. In view of the above, in some examples, linear biasing mechanism 140 and torsional biasing mechanism 120 are configured to apply the restoring force and the torsional restoring force simultaneously with one another.

Body 102 is configured to pivot about a pivotal axis and slot 106 and/or linear biasing mechanism 140, and may be described as being configured to permit linear deflection of body 102 perpendicular to the pivotal axis. In some examples, the pivotal axis of body 102 is defined by axle 108 and/or extends centrally through axle 108 parallel to axle height 162. Thus, in some examples, body 102 is configured to pivot about a fixed pivotal axis. In other words, in such examples, body 102 pivots about the same pivotal axis when body 102 is in default deflection 202 and when body 102 is among releasing deflections 208.

In some examples, axle 108 extends from guide rail 301 in an at least substantially vertical direction 226. Stated differently, in such examples, axle height 162 is at least substantially aligned with vertical direction 226. In some examples, axle 108 is received in slot 106 such that protrusion 104 extends at least substantially transverse to axle 108 and/or such that slot length 214 extends at least substantially transverse to axle height 162. In some example, linear biasing mechanism 140 and/or slot 106 engage axle 108 to support body 102 such that protrusion 104 extends at least substantially transverse to axle 108 and/or such that slot length 214 extends at least substantially transverse to axle height 162.

As shown in FIG. 4, in some examples, protrusion 104 and/or slot length 214 extends at least substantially in a lateral direction 228 when body 102 is oriented in default pivotal position 200. In some examples, protrusion 104 and/or slot length 214 extends at least partially in a longitudinal direction 211 and at an angle to lateral direction 228 when body 102 is pivoted among pivotal releasing positions 210. In other words, in some examples, protrusion 104 and/or slot length 214 extends partially in lateral direction 228 and partially in longitudinal direction 211 when body 102 is among pivotal releasing positions 210. As defined, longitudinal direction 211 and lateral direction 228 are transverse to one another and vertical direction 226 is transverse to each of longitudinal direction 211 and lateral direction 228. Thus, for some examples in which linear biasing mechanism 140 is configured to permit body 102 to deflect from default deflection 202 when body 102 is pivoted among pivotal releasing positions 210, linear biasing mechanism 140 permits body 102 to deflect both in longitudinal direction 211 and in lateral direction 228.

In some examples, axle assembly 107 is included in and/or defines a portion of cargo-restraining device 100. In such examples, axle 108 is slidingly received in slot 106 such that torsional biasing mechanism 120 and linear biasing mechanism 140 operably engage axle 108, as discussed herein. In some such examples, axle assembly 107 is configured to operatively couple cargo-restraining device 100 to guide rail 301 of an existing cargo handling system 300, or of a cargo handling system 300 that is installed in an aircraft 10. In some examples, axle assembly 107 includes a guide rail coupling mechanism 152 that is configured to couple axle 108 to the guide rail 301 of an existing cargo handling system 300. In some examples, axle assembly 107 includes an axle base 174 that is configured to orient axle 108 relative to guide rail 301, and guide rail coupling mechanism 152 is configured to couple axle base 174 to guide rail 301. In some examples, axle base 174 and guide rail coupling mechanism 152 are configured to orient axle 108 to extend at least substantially in vertical direction 226 from guide rail 301 and/or transverse to a cabin-facing surface 326 of guide rail 301. In some examples, guide rail coupling mechanism 152 is configured to fixedly position axle 108 relative to guide rail 301. Guide rail coupling mechanism 152 may include any suitable coupling mechanism such as one or more bolts, one or more screws, one or more nuts, a peg, a ring, a lockbolt, and/or combinations thereof.

In other examples, axle assembly 107 is included in and/or defines a portion of an existing or installed cargo handling system 300 and axle 108 may be referred to as an existing axle 108 or an installed axle 108. In such examples, cargo-restraining device 100 is configured to receive and engage the existing axle 108 such as discussed herein.

Slot 106 is configured to receive axle 108 in any suitable manner. In some examples, axle 108 extends through slot 106 transverse to slot length 214 when slot 106 receives axle 108. In some examples, slot 106 is configured to receive axle 108 such that axle 108 terminates within slot 106. In other examples, slot 106 is configured to receive axle 108 such that axle 108 extends entirely through slot 106. In some examples, slot 106 is configured to slidingly engage axle 108 such as to guide pivotal or linear displacement of body 102 about axle 108. In some examples, second end region 172 of slot 106 is dimensioned and shaped to slidingly contact exterior surface 166 of axle 108, such that second end region 172 of slot 106 may guide pivotal moment of body 102 when body 102 is in default deflection 202. Additionally or alternatively, as shown in FIG. 4, slot 106 includes a slot width 215, which is measured perpendicular to slot length 214 and transverse to axle height 162. Slot width 215 may be dimensioned to closely correspond to axle diameter 164 such that slot 106 slidingly receives axle 108. In this way, slot 106 may guide deflection of body 102 to and from default deflection 202.

As shown in FIG. 2, in some examples, body 102 defines a base surface 111 and an upper surface 116 that is opposed to base surface 111. In some examples, axle 108 is received in slot 106 such that base surface 111 slidingly contacts axle base 174. As shown in FIG. 2, slot 106 extends through body 102 from base surface 111 towards upper surface 116. In some examples, slot 106 extends partially through, and terminates within body 102. In other examples, slot 106 extends entirely through body 102 such that slot 106 forms a channel between upper surface 116 and base surface 111.

As shown in FIGS. 2 and 3, in some examples, cargo-restraining devices 100 include an axial retaining mechanism 160 that is configured to retain or bias body 102 to a default vertical position 204 along axle height 162 of axle 108. In particular, axial retaining mechanism 160 may be configured to restrict body 102 from deflecting up or down along axle height 162 from the default vertical position 204. When included, axial retaining mechanism 160 also is configured to permit linear and pivotal displacement of body 102 about axle 108. In some examples, axial retaining mechanism 160 includes a flange 168 that is operably secured on axle 108 to slidingly contact upper surface 116 of body 102. In such examples, flange 168 restricts vertical movement of body 102 along axle 108 while permitting linear and pivotal displacement of body 102 about axle 108. Additionally or alternatively, in some examples, axle-contacting member 144 is included in or defines axial-retaining mechanism 160 as discussed in more detail herein.

FIG. 4 also illustrates examples of cargo handling systems 300 that include a plurality of cargo-restraining devices 100 according to the present disclosure. As shown, cargo handling systems 300 are configured to guide and restrain at least one transport structure 320. Cargo handling systems 300 comprise a cargo guide assembly 302 that includes a pair of guide rails 301. The pair of guide rails 301 includes a first guide rail 304 and a second guide rail 306 that extend at least substantially parallel to one another along a longitudinal axis 212. First guide rail 304 and second guide rail 306 are laterally spaced apart from one another with a lateral rail spacing 206 extending therebetween. Lateral rail spacing 206 may define the guiding region 328 discussed herein for guiding longitudinal translation of transport structure 320. As defined herein, longitudinal axis 212 extends parallel to longitudinal direction 211, perpendicular to lateral direction 228, and perpendicular the vertical direction 226.

First guide rail 304 and second guide rail 306 are configured to restrict lateral movement of at least one transport structure 320 positioned within lateral rail spacing 206. In some examples, first guide rail 304 and second guide rail 306 are configured to guide translation of transport structure 320 along the longitudinal axis 212. Cargo handling systems 300 may be configured to guide, permit, and/or facilitate translation of transport structure 320 in a fore direction 222 along longitudinal axis 212 and/or in an aft direction 224 along longitudinal axis 212. In some more specific examples, cargo handling systems 300 are configured to guide translation of transport structure 320 in fore direction 222 during loading operations, and guide transport structure 320 in aft direction 224 during unloading operations.

In some examples, first guide rail 304 and second guide rail 306 are positioned relative to one another such that lateral rail spacing 206 is dimensioned to correspond to an outermost lateral dimension of transport structure 320. In this way, first guide rail 304 and second guide rail 306 may restrict lateral movement of transport structure 320 within lateral rail spacing 206 while permitting longitudinal translation of transport structure 320 along longitudinal axis 212. In some examples, cargo handling systems 300 include a base support structure 330 that defines a base of guiding region 328 and is configured to support the base of a transport structure 320 positioned within and/or translating along guiding region 328. When cargo handling system 300 is included in aircraft 10, base support structure 330 may be included in and/or define a portion of cabin floor 24 of aircraft 10. In some examples, base support structure 330 includes a plurality of rollers 332 positioned within lateral rail spacing 206 and configured to translatably support the base of transport structure 320. In this way, rollers 332 are configured to facilitate longitudinal translation of transport structure 320 within lateral rail spacing 206. For examples in which cargo handling systems 300 are included in aircraft 10, cargo handling systems 300 also are configured to secure transport structure 320 at a desired position within lateral rail spacing 206 to restrict movement of transport structure 320 while aircraft 10 is in flight and/or otherwise moving. In some such examples, cargo handling systems 300 are configured to secure a plurality of transport structures 320 at a plurality of desired locations within lateral rail spacing 206.

Cargo handling systems 300 also include a plurality of cargo-restraining devices 100 operably coupled to the pair of guide rails 301. More specifically, cargo handling systems 300 include a first subset 308 of cargo-restraining devices 100 that are operably coupled to and extend from first guide rail 304, and a second subset 310 of cargo-restraining devices 100 that are operably coupled to and extend from second guide rail 306. Each cargo-restraining device 100 of first subset 308 is operably coupled to first guide rail 304 by axle 108 of a respective axle assembly 107, and each cargo-restraining device 100 of second subset 310 is operably coupled to second guide rail 306 by axle 108 of a respective axle assembly 107, as discussed herein. For examples in which cargo handling system 300 is included and/or defines a portion of cabin floor 24, axle 108 and/or axle assembly 107 may be described as operatively coupling the respective cargo-restraining device 100 to cabin floor 24.

First subset 308 and second subset 310 of cargo-restraining devices 100 may be longitudinally aligned with one another or longitudinally offset from one another. Similarly, first subset 308 and second subset 310 of cargo-restraining devices 100 each include any suitable number of cargo-restraining devices 100, which may be the same or different from one another.

As shown in FIG. 4, in default pivotal position 200, protrusion 104 of each cargo-restraining device 100 of first subset 308 and protrusion 104 of each cargo-restraining device 100 of second subset 310 extends transverse to longitudinal axis 212 and into lateral rail spacing 206. Cargo-restraining devices 100 are configured to restrict vertical movement of transport structure 320 positioned within lateral rail spacing 206. More specifically, as illustrated is FIG. 2, in some examples, cargo-restraining device 100 is operatively coupled to guide rail 301 such that protrusion 104 extends into lateral rail spacing 206 vertically spaced apart from base support structure 330 of cargo handling system 300. In some examples, protrusion 104 of each cargo-restraining device 100 defines a vertical retaining surface 112 that is configured to operatively contact transport structure 320 to restrict vertical movement thereof.

As shown in FIG. 4, in some examples, when transport structure 320 is positioned adjacent a cargo-restraining device 100, a peripheral region 334 of transport structure 320 extends between vertical retaining surface 112 of protrusion 104 and base support structure 330 of cargo handling system 300. In such examples, vertical retaining surface 112 is configured to operatively contact peripheral region 334 to restrict vertical movement of transport structure 320 within lateral rail spacing 206. In some such examples, cargo-restraining device 100 extends from guide rail 301 such that vertical retaining surface 112 slidingly contacts peripheral region 334 to permit longitudinal translation of transport structure 320. Additionally or alternatively, cargo-restraining device 100 extends from guide rail 301 such that vertical retaining surface 112 only contacts peripheral region 334 when transport structure 320 translates in vertical direction 226.

In some examples, first subset 308 and second subset 310 of cargo-restraining devices 100 are positioned to restrict vertical movement of transport structure 320 simultaneously with one another. In particular, first subset 308 and second subset 310 of cargo-restraining devices 100 may be positioned to operably engage opposing peripheral regions 334 of transport structure 320 to collectively restrict vertical movement thereof.

As shown in FIG. 4, when cargo-restraining device 100 is not engaged or contacted by a transport structure 320, linear biasing mechanism 140 orients body 102 in default deflection 202 and torsional biasing mechanism 120 orients body 102 in default pivotal position 200. In some examples, torsional biasing mechanism 120 is configured to permit pivotal displacement of body 102 from default pivotal position 200 when a torque is applied to protrusion 104 by a transport structure 320 translating along longitudinal axis 212 within lateral rail spacing 206.

As a more specific example, transport structure 320 may include one or more vertically-protruding features 324. In some examples, vertically-protruding feature 324 is positioned along transport structure 320 such that vertically-protruding feature 324 collides with, engages, and/or contacts protrusion 104 of a cargo-restraining device 100 during longitudinal translation of transport structure 320 within guiding region 328. In some examples, one or more vertically-protruding features 324 extend along one or more peripheral regions 334 of transport structure 320. In some examples, torsional biasing mechanism 120 of each cargo-restraining device 100 is configured to permit pivotal displacement of body 102 from default pivotal position 200 to among the plurality of pivotal releasing positions 210 when vertically-protruding feature 324 engages or applies a torque to protrusion 104.

In some examples, protrusion 104 is oriented to release vertically-protruding feature 324 and permit continued translation of transport structure 320 when body 102 is among the plurality of pivotal releasing positions 210. In other words, torsional biasing mechanism 120 is configured to permit pivotal deflection of protrusion 104 from the path of translation of vertically-protruding feature 324, thereby allowing vertically-protruding feature 324 to translate past cargo-restraining device 100. More specifically, body 102 pivot towards aft direction 224 when engaged by a transport structure 320 translating in aft direction 224, and pivots towards fore direction 222 when engaged by a transport structure 320 translating in fore direction 222. Once vertically-protruding feature 324 releases protrusion 104 and/or no longer applies torque to protrusion 104, torsional biasing mechanism 120 applies the torsional restoring force to urge body 102 back to default pivotal position 200.

In some examples, linear biasing mechanism 140 of each cargo-restraining device 100 is configured to permit linear displacement of body 102 from default deflection 202 when transport structure 320 is translating along longitudinal axis 212, and within lateral rail spacing 206, and applies a force to body 102 that urges protrusion 104, or outermost extent 218 thereof, towards axle 108. In some examples, this force includes a lateral force component, (i.e., force component in lateral direction 228) and/or a longitudinal force component (i.e., a force component parallel to longitudinal axis 212). More specifically, this force includes both the lateral force component and a longitudinal force component when body 102 is oriented among the pivotal releasing positions 210.

In some examples, linear biasing mechanism 140 is configured to permit linear displacement of body 102 in an outward direction from lateral rail spacing 206, such that protrusion 104 deflects away from transport structure 320 when body 102 deflects from default deflection 202. In some examples, linear biasing mechanism 140 is configured to permit linear displacement of body 102 from default deflection 202 to among the plurality of releasing deflections 208 when the force exerted on body 102 exceeds a threshold. In some such examples, linear biasing mechanism 140 is configured to urge body 102 from among the plurality of releasing deflections 208 when the lateral force does not exceed the threshold. In other words, linear biasing mechanism 140 may permit body 102 to deflect from default deflection 202 when body 102 is engaged by transport structure 320 and returns body 102 to default deflection 202 when body 102 is released by, or not engaged by, transport structure 320.

As mentioned, in some examples, linear biasing mechanism 140 is configured to permit body 102 to deflect from default deflection 202 while body 102 is pivoted among pivotal releasing positions 210. In other words, in some examples, cargo-restraining device 100 is configured to permit body 102 to be simultaneously deflected to among releasing deflections 208 and pivoted to among pivotal releasing positions 210. As shown in FIG. 4, when body 102 is pivoted among pivotal releasing positions 210, protrusion 104, or outermost length of body 102, may extend partially parallel to longitudinal axis 212 and partially in lateral direction 228.

In some examples, linear biasing mechanism 140 is configured to permit body 102 to deflect from default deflection 202 to release body 102 from among the pivotal releasing positions 210. As shown in FIG. 4, in some examples, protrusion 104 is engaged by a transport structure 320 translating within lateral rail spacing 206 while body 102 is pivoted to a pivotal releasing position 210 that orients protrusion 104 to extend towards the oncoming transport structure 320 and/or vertically-protruding feature 324 thereof. In some such examples, linear biasing mechanism 140 is configured to permit body 102 to deflect from default deflection 202 as protrusion 104 is engaged by transport structure 320 in pivotal releasing position 210. By doing so, linear biasing mechanism 140 permits body 102 to deflect away from lateral rail spacing 206, and at least partially in a longitudinal direction 211, as protrusion 104 is engaged by transport structure 320. More specifically, body 102 is permitted to deflect at least partially in the fore direction 222 for examples in which the transport structure 320 is translating in fore direction 222, and vice versa for examples in which transport structure 320 is translating in aft direction 224. In this way, protrusion 104 is moved along and outwardly from the path of translation of transport structure 320, thereby allowing transport structure 320 to continue to translate longitudinally within lateral rail spacing 206. In other words, slot 106 and linear biasing mechanism 140 provide cargo-restraining device 100 with an additional degree of freedom that allows protrusion 104 to deflect away from the path of transport structure 320 when protrusion 104 is engaged by transport structure 320 in this pivotal releasing position 210.

More specifically, a cargo-restraining device 100 that does not include the additional degree of freedom provided by slot 106 and linear biasing mechanism 140 may be unable to pivot from this pivotal releasing position 210 when engaged by transport structure 320 as discussed, and thereby unable to move from the path of translation of transport structure 320. Thus, a cargo-restraining device that does not include the additional degree of freedom provided by slot 106 and linear biasing mechanism 140 may restrict longitudinal translation of, or jam with, transport structure 320 when engaged by transport structure 320 in this pivotal releasing position 210. In view of this, cargo-restraining device 100 may be described as being configured to prevent jamming with a longitudinally translating transport structure 320.

In some examples, transport structure 320 comprises a plurality of vertically-protruding features 324, each being positioned to engage a given cargo-restraining device 100 during longitudinal translation of transport structure 320 within lateral rail spacing 206. In some examples, torsional biasing mechanism 120 is configured return body 102 to default pivotal position 200 after protrusion 104 is engaged and released by a first vertically-protruding feature 324 of a transport structure 320 and before protrusion 104 is engaged by a second vertically-protruding feature 324 such that body 102 is in default pivotal position 200 when the second vertically-protruding feature 234 reaches cargo-restraining device 100. Likewise, in some examples, linear biasing mechanism 140 is configured to return body 102 to default deflection 202 after protrusion 104 is engaged and released by a first vertically-protruding feature 324 of a transport structure 320 and before protrusion 104 is engaged by a second vertically-protruding feature 324 of the transport structure 320 such that body 102 is in default deflection 202 when the second vertically-protruding feature 324 reaches cargo-restraining device 100.

In some examples, after protrusion 104 is released by the first vertically-protruding feature 324, torsional biasing mechanism 120 pivots body 102 beyond default pivotal position 200 to a pivotal releasing position 210 that orients protrusion 104 to extend towards the second vertically-protruding feature 324. In some such examples, protrusion 104 is oriented to extend towards the second vertically-protruding feature 324 when the second vertically-protruding feature 324 engages protrusion 104. In some such examples, linear biasing mechanism 140 permits body 102 to deflect from default deflection 202 when protrusion 104 is engaged by the second vertically-protruding feature 324 in this orientation, thereby permitting body 102 to move along and outwardly from the path of the second vertically-protruding feature 324, such as discussed herein. After being released by the second vertically-protruding feature 324, linear biasing mechanism 140 may return body 102 to default deflection 202 and torsional biasing mechanism 120 may return body 102 to default pivotal position 200.

In some examples, cargo handling systems 300 are configured to guide and restrain a plurality of transport structures 320, which may be positioned within lateral rail spacing 206 simultaneously with one another. In some such examples, cargo-restraining devices 100 are configured to permit sequential longitudinal translation of a plurality of transport structures 320 within lateral rail spacing 206 while restraining vertical movement thereof. In some examples, each cargo-restraining device 100 is configured to return body 102 to default pivotal position 200 and/or to default deflection 202 after being engaged by a first transport structure 320 and before being engaged by a subsequent transport structure 320.

With continued reference to FIG. 4, cargo handling systems 300 may be configured to guide and restrain any suitable type of transport structure 320. In some examples, transport structure 320 includes, supports, or is at least one item of cargo 34, and optionally a plurality of items of cargo 34. As more examples, transport structure 320 may include a container, a shipping container, a cargo pallet, and/or one or more items of cargo supported by the cargo pallet and/or shipping container. For some examples in which transport structure 320 includes a cargo pallet, vertically-protruding feature(s) 324 correspond to pallet blocks disposed on an upper surface of the cargo pallet. For some examples in which cargo handling systems 300 are included in aircraft 10, transport structure(s) 320 are translated in the fore direction 222 to load transport structure(s) into aircraft 10, and transport structure(s) 320 are translated in aft direction 224 to unload transport structure(s) from aircraft 10.

Figure 5:
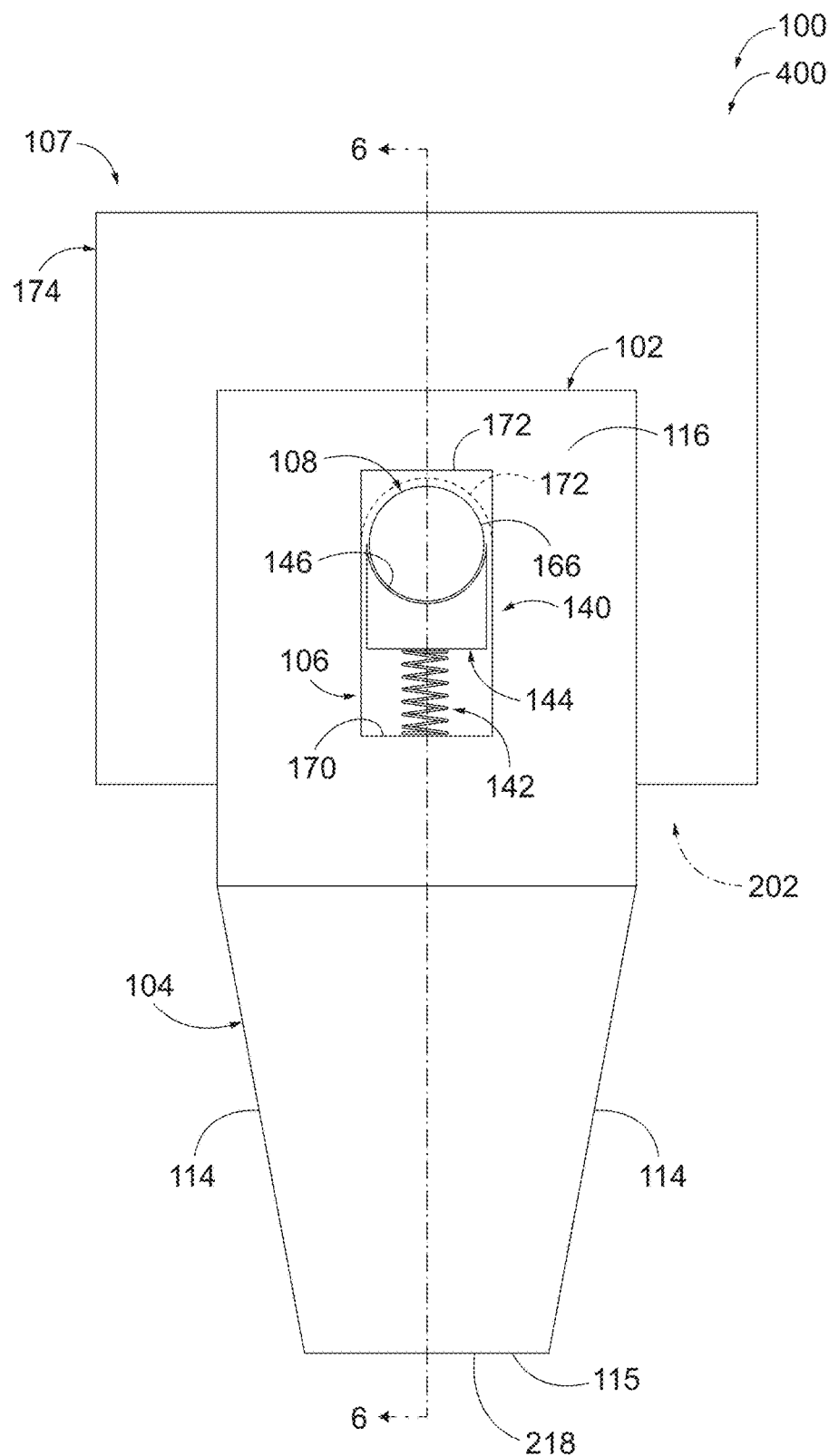
FIG. 5 is a top-down view of an example cargo-restraining device, according to the present disclosure.
Figure 6:
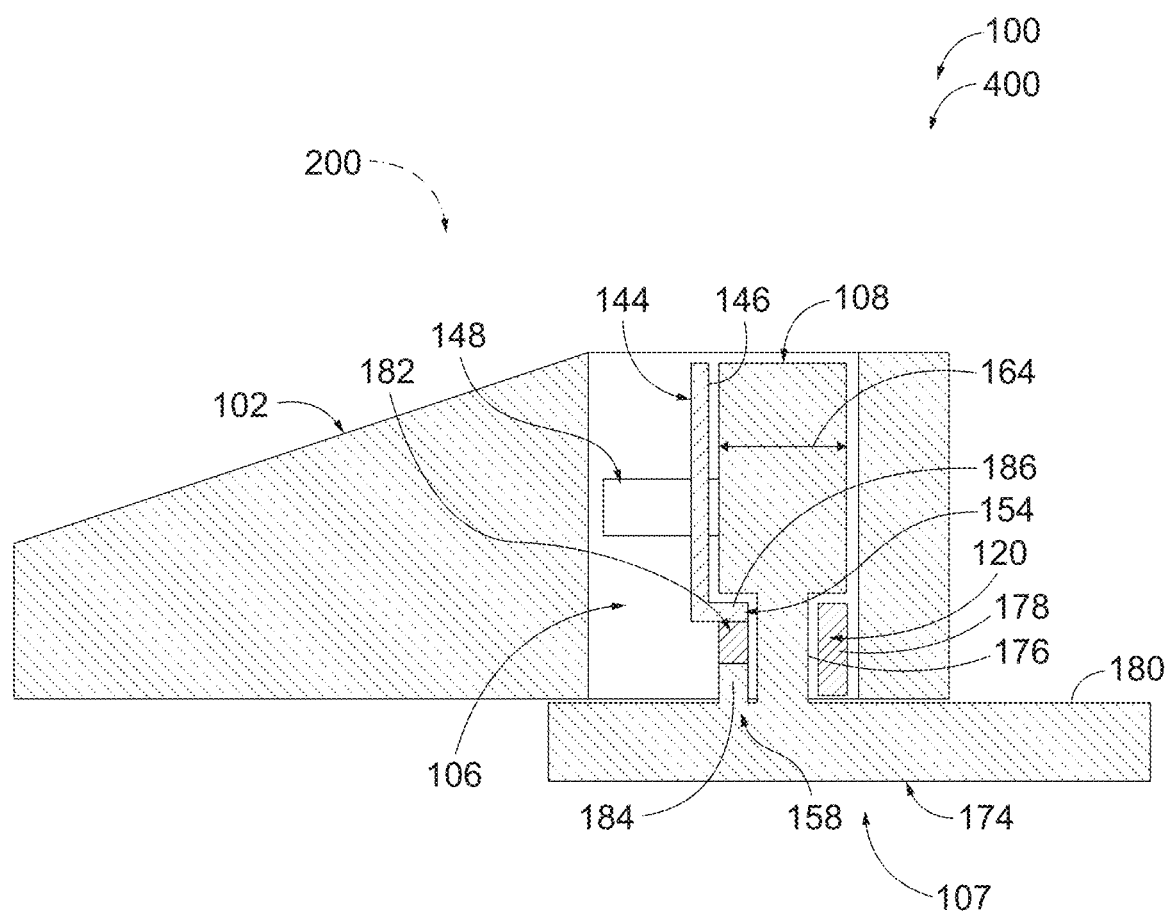
FIG. 6 is a cross-sectional view of the example cargo-restraining device of FIG. 5.
Figure 7:
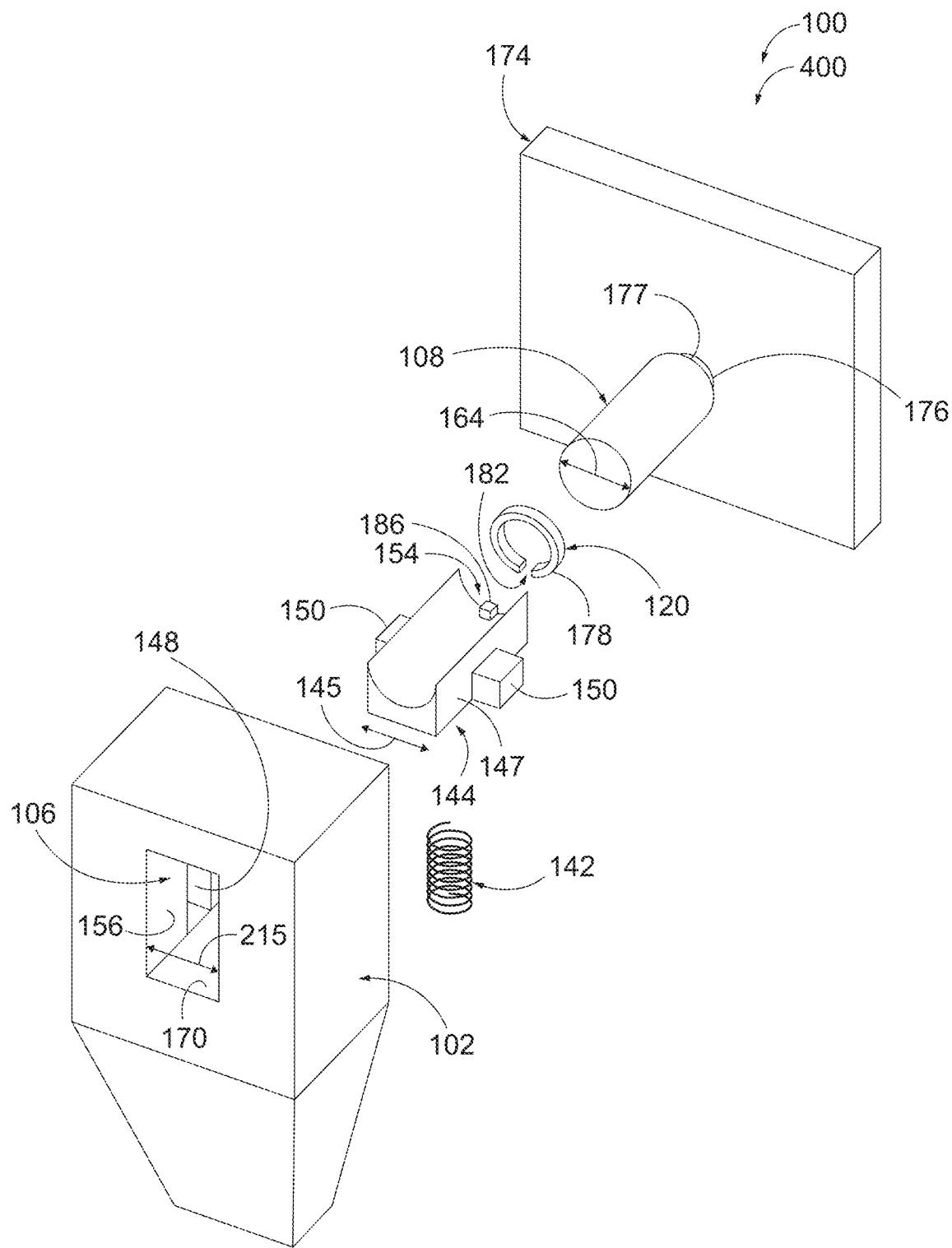
FIG. 7 is an exploded view of the example cargo-restraining device of FIG. 5.
Figure 8:
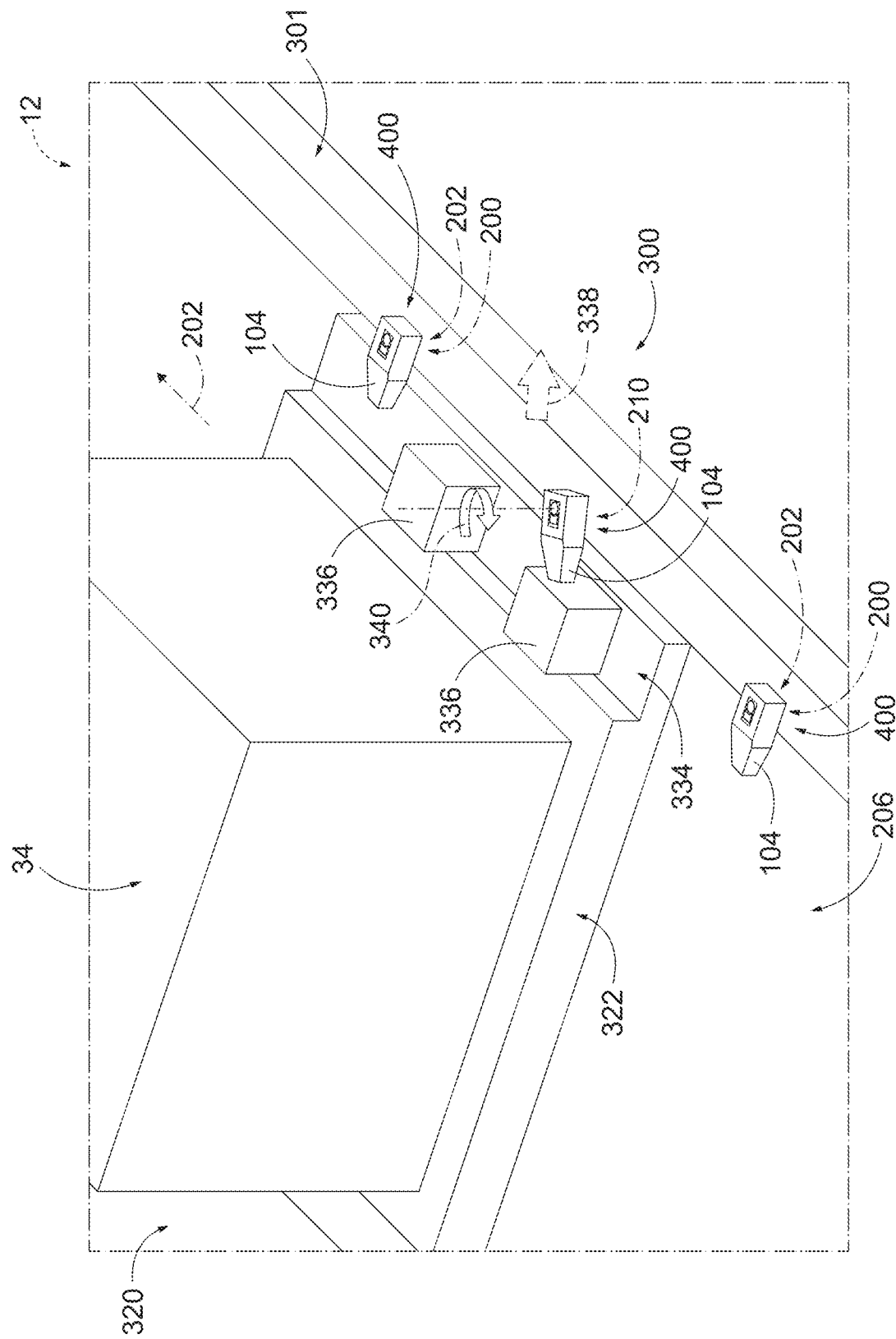
FIG. 8 is an isometric view illustrating an example cargo handling system that includes a plurality of the example cargo handling devices of FIG. 5.

FIGS. 5-8 provide an illustrative non-exclusive example of cargo-restraining devices 100 that is indicated at and referred to herein as cargo-restraining device 400. More specifically, FIGS. 5-7 illustrate various views of cargo-restraining device 400, and FIG. 8 illustrates an example of cargo-restraining device 400 included in an example cargo handling system 300. Where appropriate, the reference numerals from the schematic illustrations of FIGS. 2-4 are used to designate corresponding parts of the example cargo-restraining device 400 and the example cargo handling system 300; however, the examples of FIGS. 5-8 are non-exclusive and do not limit cargo-restraining devices 100 or cargo handling systems 300 to the illustrative embodiment of cargo handling system 300 of cargo-restraining device 100. That is, cargo-restraining devices 100 may incorporate any number of the various aspects, configurations, characteristics, properties, variants, options etc. of cargo-restraining devices 100 that are illustrated and discussed herein with reference to the schematic representations of FIGS. 2-4 and/or the embodiment of FIGS. 5-8, as well as variations thereof, without requiring the inclusion of all such aspects, configurations, characteristics, properties, variants, options etc. Furthermore, any additional aspects, configurations, characteristics, properties, variants, options, etc. disclosed in connection with the example cargo-restraining device 400 of FIGS. 5-8 may be utilized with and/or otherwise included in other cargo-restraining devices 100, including cargo-restraining devices 100 according to FIGS. 2-4. For the purpose of brevity, each previously discussed component, part, portion, aspect, region, etc. or variants thereof may not be discussed, illustrated, and/or labeled again with respect to the examples of FIGS. 5-8; however, it is within the scope of the present disclosure that the previously discussed features, variants, etc. may be utilized with the examples of FIGS. 5-8.

With initial reference to FIG. 5, illustrate therein is top down view of cargo-restraining device 400. As shown, axle assembly 107 includes axle 108 and axle base 174 from which axle 108 extends. Axle 108 is operably received in slot 106 of body 102, with body 102 resting on axle base 174. In this example, slot 106 extends through the entirety through body 102 from the base surface 111 of body 102 through upper surface 116. Linear biasing mechanism 140 is positioned within slot 106 and extends between axle 108 and first end region 170 of slot 106. More specifically, linear biasing mechanism 140 includes axle-contacting member 144 that is slidingly engaged with axle 108 and linear restoring mechanism 142 which extends between axle-contacting member 144 and first end region 170 of slot 106. In FIG. 5, linear restoring mechanism 142 applies an outward restoring force between axle-contacting member 144 and first end region 170 of slot 106 such that body 102 is biased or supported in default deflection 202. In this example, linear restoring mechanism 142 comprises a compression spring that is configured to supply a restoring force against first end region 170 of slot 106 deflecting towards axle 108.

Axle-contacting region 146 of axle-contacting member 144 comprises a semi-cylindrical recess that is shaped and dimensioned to correspond to the cylindrical exterior surface 166 of axle 108. Linear restoring mechanism 142 urges axle-contacting region 146 into sliding engagement with axle 108. In this way, linear biasing mechanism 140 is configured to apply the linear restoring force when body 102 is pivoted to any pivotal position about axle 108. As shown in dashed lines in FIG. 5, in some examples, second end region 172 of slot 106 defines a semi-cylindrical surface that is dimensioned and shaped to correspond to exterior surface 166 of axle 108. In such examples, second end region 172 of slot 106 is configured to slidingly contact axle 108 when body 102 is in default deflection 202 and guide pivotal displacement of body 102 about axle 108.

With continued reference to FIG. 5, the width of body 102 is tapered along protrusion 104 towards the outermost extent 218 of protrusion 104. In this way, protrusion 104 is provided with two lateral abutting surfaces 114 that are angled or tapered relative to the outermost length of body 102. In some examples, lateral abutting surfaces 114 are angled to facilitate pivotal deflection of body 102 when protrusion 104 is engaged by a translating transport structure 320. Protrusion 104 also defines a distal surface 115 that extends between lateral abutting surfaces 114 and includes outermost extent of protrusion 104.

Turning to FIG. 6, illustrated therein is a cross-sectional view of cargo-restraining device 400 taken along line 6-6 shown in FIG. 5. Linear restoring mechanism 142 is removed from slot 106 in FIG. 6 for sake of clarity. As shown, axle 108 extends from axle base 174 at least substantially perpendicular to a top surface 180 of axle base 174. Axle 108 defines a cylindrical recess 176 proximate to axle base 174, such that axle diameter 164 is smaller along cylindrical recess 176 than along the upper portion of axle 108. In this example, torsional biasing mechanism 120 comprises a C-spring 178 that is received around cylindrical recess 176. Axle assembly 107 includes torsional biasing mechanism-engaging member 158 that engages with C-spring 178 to prevent C-spring 178 from freely pivoting about axle 108 with body 102. More specifically, C-spring 178 defines gap 182 that separates the two ends of C-spring 178, and torsional biasing mechanism-engaging member 158 comprises a tab 184 that protrudes from top surface 180 of axle base 174. C-spring 178 is received around cylindrical recess 176 such that tab 184 is positioned within gap 182. In some examples, gap 182 and tab 184 are dimensioned such that tab 184 is closely received in gap 182 and/or contacts the two ends of C-spring 178.

With continued reference to FIG. 6, axle-contacting member 144 includes pivotal engaging member 154 that is configured to operatively engage C-spring 178. Here, pivotal engaging member 154 includes a toe 186 that protrudes from axle-contacting region 146 to extend within cylindrical recess 176. More specifically, toe 186 extends within gap 182 of C-spring 178 spaced apart from tab 184 of axle assembly 107. Stated differently, tab 184 of axle assembly 107 is positioned within a lower region of gap 182 and toe 186 of axle-contacting member 144 is positioned within an upper region of gap 182 such that toe 186 is permitted to pivot along with body 102 relative to tab 184. In some examples, gap 182 and toe 186 are dimensioned such that toe 186 is closely received in gap 182 and/or contacts the two ends of C-spring 178.

In this example, C-spring 178 is configured to engage with toe 186 and tab 184 to bias body 102 to default pivotal position 200 and/or to urge body 102 towards default pivotal position 200 when body 102 is pivoted from default pivotal position 200. More specifically, C-spring 178 aligns toe 186 with tab 184 when body 102 is in default pivotal position 200. Toe 186 of axle-contacting member 144 is configured to pivot with body 102 such that toe 186 and tab 184 are pivotally offset from one another when body 102 is pivoted from default pivotal position 200. Correspondingly, toe 186 and tab 184 engage separate ends of C-spring 178 when body 102 is pivoted from default pivotal position 200, and thereby apply a compressive force to C-spring 178. To urge body 102 towards default pivotal position 200, C-spring 178 applies a restoring force between toe 186 and tab 184 to urge toe 186 and tab 184 into alignment with one another.

With continued reference to FIG. 6, body 102 includes linear guides 148 that are disposed along lateral sidewalls of slot 106 and extend at least substantially parallel to slot length 214. Linear guides 148 are configured to slidingly engage with axle-contacting member 144 as discussed herein with reference to FIG. 7.

Turning to FIG. 7, illustrated therein is an exploded view of cargo-restraining device 400. As shown in this example, C-spring 178 of torsional biasing mechanism 120 is dimensioned and shaped to extend around cylindrical recess 176 of axle 108, and C-spring 178 defines gap 182 that separates the two ends of C-spring 178. Toe 186 of axle-contacting member 144 is positioned along axle-contacting region 146 to extend within gap 182 when C-spring 178 is received on axle 108 and axle-contacting member 144 operably engages axle 108. Axle-contacting member 144 further incudes a pair of guide-contacting members 150 that are dimensioned and shaped to be received in linear guides 148 disposed along the lateral sidewalls of slot 106. As discussed herein, guide-contacting members 150 and linear guides 148 of body cooperatively are configured to guide lateral translation of body 102 relative to axle 108. Guide-contacting members 150 and linear guides 148 also may prevent axle-contacting member 144 from translating vertically within slot 106. In some examples, toe 186 is configured to slidingly engage with an upper ledge 177 defined by cylindrical recess 176 to restrict vertical movement of axle-contacting member 144 along axle 108. Correspondingly, when guide-contacting members 150 are engaged with linear guides 148, and toe 186 is slidingly engaged with upper ledge 177, linear guides 148 and axle-contacting member 144 may restrict vertical movement of body 102 along axle 108 and/or define axial retaining mechanism 160 as discussed herein.

Further shown in the example of FIG. 7, slot width 215 of slot 106 is dimensioned to closely correspond to axle diameter 164 such that slot 106 is configured to guide linear displacement of body 102 to and from default deflection 202. Similarly, in some examples, axle-contacting member 144 defines an axle-contacting member width 145 that is at least substantially aligned with slot width 215 when axle-contacting member 144 is received in slot 106. In some examples, axle-contacting member 144 and slot 106 are dimensioned such that axle-contacting member width 145 closely corresponds to slot width 215 and lateral sidewalls 147 of axle-contacting member 144 slidingly engage lateral sidewalls 156 of slot 106. In some such examples, axle-contacting member 144 is configured to transmit torsional force from torsional biasing mechanism 120 to body 102 by engaging with lateral sidewalls 156 of slot 106.

Further shown, linear restoring mechanism 142 comprises a compression spring that is configured to extend between first end region 170 of slot 106 and a rear surface of axle-contacting member 144 that is opposed to axle-contacting region 146.

FIG. 8 illustrates an example cargo handling system 300 that includes a plurality of cargo-restraining devices 400. In this example, cargo handling system 300 is guiding and restraining a transport structure 320 translating in fore direction 222 within lateral rail spacing 206 defined by guide rails 301. More specifically, transport structure 320 comprises an item of cargo 34 and a cargo pallet 322 that supports the item of cargo 34. Cargo pallet 322 includes a plurality of pallet blocks 336 that extend upwardly from peripheral region 334 of cargo pallet 322 and define the vertically-protruding features 324 of transport structure 320 discussed herein. Pallet blocks 336 are arranged about the lateral sides of cargo pallet 322 such that protrusion 104 of each cargo-restraining device 400 is engaged by two pallet blocks 336 as cargo pallet 322 translates past each cargo-restraining device 400.

In the example of FIG. 8, protrusion 104 of one of the cargo-restraining devices 400 is in operative contact with the second of the two pallet blocks 336. More specifically, body 102 of this cargo-restraining device 400 is pivoted to a pivotal releasing position 210 that orients the respective protrusion 104 to extend partially in aft direction 224 or opposite the direction which pallet block 336 is translating. In this orientation, pallet block 336 operatively contacts distal surface 115 of protrusion 104, rather than the lateral abutting surface 114 of protrusion that pallet block 336 would contact when protrusion 104 is engaged by pallet block 336 with body 102 oriented in default pivotal position 200.

In some examples, body 102 is oriented in pivotal releasing position 210 after engaging with the first pallet block 336. More specifically, in some examples, torsional biasing mechanism 120 over rotates or pivots body 102 beyond default pivotal position 200 after being released by the first pallet block 336, causing body 102 to be in pivotal releasing position 210 shown in FIG. 8 when protrusion 104 is engaged by the second pallet block 336. In this particular example, torsional biasing mechanism 120 pivoted body 102 beyond default pivotal position 200 in a counterclockwise direction.

As pallet block 336 translates past cargo-restraining device 400, pallet block 336 applies force to protrusion 104 that is directed laterally outward from lateral rail spacing 206 and in fore direction 222. Responsive to this force, linear biasing mechanism 140 permits body 102 to deflect relative to axle 108 along slot 106, thereby permitting protrusion 104 to deflect in a direction 338 that is laterally outward from lateral rail spacing 206 and in fore direction 222. Simultaneously, torsional biasing mechanism 120 permits body 102 to pivot in a clockwise direction 340 from the pivotal releasing position 210 shown. In this way, linear biasing mechanism 140, together with torsional biasing mechanism 120, permit pivotal and linear deflection of protrusion 104 along with the movement of pallet block 336, thereby allowing pallet block 336 to continue to translate past the respective cargo-restraining device. Once pallet block 336 releases protrusion 104, linear biasing mechanism 140 and torsional biasing mechanism 120 return body 102 to default pivotal position 200 and default deflection 202 as illustrated in the adjacent cargo-restraining devices 400.

Illustrative, non-exclusive examples of inventive subject matter according to the present disclosure are described in the following enumerated paragraphs:

A1. A cargo-restraining device (100), comprising:
a body (102) comprising a protrusion (104) and defining a slot (106) extending at least partially through the body (102) transverse to the protrusion (104), wherein the slot (106) is configured to slidingly receive an axle (108) of an axle assembly (107), wherein the axle assembly (107) is configured to operatively couple the cargo-restraining device (100) to a guide rail (301) of a cargo handling system (300);
a torsional biasing mechanism (120) operably engaged with the body (102) and configured to engage with the axle assembly (107) to bias the body (102) toward a default pivotal position (200) relative to the axle (108);
a linear biasing mechanism (140) engaged with the body (102) and configured to engage with the axle (108) to bias the body (102) toward a default deflection (202) relative to the axle (108); and
wherein the slot (106) is configured to constrain linear displacement of the body (102) relative to the axle (108).

A2. The cargo-restraining device (100) of paragraph A1, wherein the linear biasing mechanism (140) is configured to restrict deflection of the body (102) beyond a maximum threshold linear deflection.

A2.1. The cargo-restraining device (100) of paragraph A2, wherein the slot (106) has a slot length (214) traverse to the axle (108), wherein the body (102) has an outermost length (216) that is aligned with the slot length (214), wherein the maximum threshold linear deflection is a threshold fraction of the slot length (214), wherein the threshold fraction is at least 5%, at least 10%, at least 20%, at least 30%, at least 40%, at least 50%, at least 60%, at least 70%, at most 90%, at most 80%, at most 70%, at most 60%, at most 50%, at most 40%, at most 30%, at most 20%, at most 10% and/or at most 5%.

A3. The cargo-restraining device (100) of any of paragraphs A1-A2.1, wherein the linear biasing mechanism (140) is configured to apply a restoring force between the body (102) and the axle (108) when the body (102) is displaced from the default deflection (202) to urge the body (102) toward the default deflection (202).

A3.1. The cargo-restraining device (100) of paragraph A3, wherein the linear biasing mechanism (140) is configured to apply the restoring force between the body (102) and the axle (108) when the body (102) is in the default pivotal position (200) and when the body (102) is pivoted from the default pivotal position (200).

A3.2. The cargo-restraining device (100) of any of paragraphs A3-A3.1, wherein the linear biasing mechanism (140) comprises a linear restoring mechanism (142) that is configured to apply the restoring force to bias the body (102) toward the default deflection (202) and urge the body (102) toward the default deflection (202) when the body (102) is displaced from the default deflection (202).

A3.2.1. The cargo-restraining device (100) of paragraph A3.2, wherein the linear restoring mechanism (142) is configured to apply an outward restoring force between the axle (108) and a first end region (170) of slot (106) to urge the body (102) toward the default deflection (202).

A3.3. The cargo-restraining device (100) of any of paragraphs A1-A3.2, wherein at least a portion of the linear biasing mechanism (140) is disposed within the slot (106).

A4. The cargo-restraining device (100) of any of paragraphs A1-A3.3, wherein the linear biasing mechanism (140) comprises an axle-contacting member (144) configured to pivotally engage the axle (108) and permit pivotal movement of the linear biasing mechanism (140) and the body (102) about the axle (108).

A4.1. The cargo-restraining device (100) of paragraph A4, when depending from paragraph A3.2, wherein the axle-contacting member (144) is operatively coupled to the linear restoring mechanism (142).

A4.1.1. The cargo-restraining device (100) of paragraph A4.1, wherein the linear restoring mechanism (142) is configured to urge the axle-contacting member (144) into operative contact with the axle (108) when the axle (108) is received in the slot (106).

A4.2. The cargo-restraining device (100) of any of paragraphs A4-A4.1, wherein the axle-contacting member (144) is configured to guide pivotal movement of the body (102) about the axle (108) when the body (102) is displaced from the default deflection (202).

A4.3. The cargo-restraining device (100) of any of paragraphs A4-A4.2, wherein the axle-contacting member (144) comprises an axle-contacting region (146) that is dimensioned and shaped to correspond to a region of an exterior surface of the axle (108).

A4.4. The cargo-restraining device (100) of any of paragraphs A4.1-A4.3, wherein the body (102) includes at least one linear guide (148) disposed within the slot (106) and extending at least substantially parallel to a/the slot length (214) of the slot (106), wherein the axle-contacting member (144) includes at least one guide-contacting member (150) that is slidably engaged with the at least one linear guide (148), and wherein the at least one linear guide (148) and the at least one guide-contacting member (150) are configured to constrain the linear displacement of the body (102) relative to the axle (108).

A5. The cargo-restraining device (100) of any of paragraphs A1-A4.4, wherein the torsional biasing mechanism (120) is configured to apply a torsional restoring force between the body (102) and the axle (108) to urge the body (102) toward the default pivotal position (200).

A5.1. The cargo-restraining device (100) of paragraph A5, wherein the torsional biasing mechanism (120) is configured to apply the torsional restoring force when the body (102) is in the default deflection (202) and when the body (102) is deflected from the default deflection (202).

A5.2. The cargo-restraining device (100) of any of paragraphs A5-A5.1, when depending from paragraph A3, wherein the torsional biasing mechanism (120) and the linear biasing mechanism (140) are configured to apply the torsional restoring force and the restoring force simultaneously with one another.

A6. The cargo-restraining device (100) of any of paragraphs A1-A5.2, wherein at least a portion of the torsional biasing mechanism (120) is disposed within the slot (106).

A7. The cargo-restraining device (100) of any of paragraphs A1-A6, further comprising an axial retaining mechanism (160) configured to retain or bias the body (102) to a default vertical position (204) along the axle (108).

A8. The cargo-restraining device (100) of any of paragraphs A1-A7, wherein the cargo-restraining device (100) is a vertical-restraining device (110) configured to restrict vertical movement of a transport structure translating longitudinally relative to the cargo-restraining device (100).

A9. The cargo-restraining device (100) of any of paragraphs A1-A8, further comprising the axle (108), wherein the axle (108) is slidingly received in the slot (106), wherein the torsional biasing mechanism (120) is engaged with the axle (108), and wherein the linear biasing mechanism (140) is engaged with the axle (108).

A9.1. The cargo-restraining device (100) of paragraph A9, wherein the axle (108) is operatively coupled to the guide rail (301) of the cargo handling system (300).

A9.2. The cargo-restraining device (100) of any of paragraphs A9-A9.1, wherein the axle assembly (107) comprises a guide rail coupling mechanism (152) that is configured to operatively couple the axle (108) to the guide rail (301).

A9.2.1. The cargo-restraining device (100) of paragraph A9.2, wherein the guide rail coupling mechanism (152) is configured to orient the axle (108) to extend outwardly from and transverse to a cabin-facing surface (326) of the guide rail (301).

B1. A cargo handling system (300) configured to guide and restrain at least one transport structure (320), the cargo handling system (300) comprising:
a cargo guide assembly (302) comprising a first guide rail (304) and a second guide rail (306) extending at least substantially parallel to one another along a longitudinal axis (212), wherein the first guide rail (304) and the second guide rail (306) are laterally spaced apart from one another with a lateral rail spacing (206) therebetween;
a plurality of cargo-restraining devices (100), wherein each cargo-restraining device (100) of the plurality of cargo-restraining devices (100) is the cargo-restraining device (100) of any of paragraphs A1-A9.2; and
wherein a first subset (308) of the plurality of cargo-restraining devices (100) are operably coupled to and extend from the first guide rail (304) and a second subset (310) of the plurality of cargo-restraining devices (100) are operably coupled to and extend from the second guide rail (306).

B1.1. The cargo handling system (300) of paragraph B1, wherein, in the default pivotal position (200), the protrusion (104) of each of the first subset (308) and the second subset (310) of the plurality of cargo-restraining devices (100) extends traverse to the longitudinal axis (212) and into the lateral rail spacing (206);

B1.2. The cargo handling system (300) of any of paragraphs B1-B1.1, wherein the first guide rail (304) and the second guide rail (306) are configured to restrict lateral movement of the at least one transport structure (320) positioned within the lateral rail spacing (206), and wherein the plurality of cargo-restraining devices (100) are configured to restrict vertical movement of the at least one transport structure (320) positioned within the lateral rail spacing (206).

B2. The cargo handling system (300) of any of paragraphs B1-B1.2, wherein the plurality of cargo-restraining devices (100) are configured to restrict vertical movement of the at least one transport structure (320) when the at least one transport structure (320) is translating along the longitudinal axis (212) within the lateral rail spacing (206) and when the at least one transport structure (320) is operably secured within the lateral rail spacing (206).

B2.1. The cargo handling system (300) of paragraph B2, wherein the first guide rail (304) and the second guide rail (306) are configured to guide translation of the at least one transport structure (320) along the longitudinal axis (212).

B2.2. The cargo handling system (300) of any of paragraphs B1-B2.1, wherein the torsional biasing mechanism (120) of each cargo-restraining device (100) of the plurality of cargo-restraining devices (100) is configured to permit pivotal displacement of the body (102) from the default pivotal position (200) when a torque is applied the protrusion (104) by the at least one transport structure (320) translating along the longitudinal axis (212).

B3. The cargo handling system (300) of any of paragraphs B1-B2.2, wherein the linear biasing mechanism (140) of each cargo-restraining device (100) of the plurality of cargo-restraining devices (100) is configured to permit linear displacement of the body (102) from the default deflection (202) when a force is applied to the respective protrusion (104) by the at least one transport structure (320) translating along the longitudinal axis (212) that urges the respective protrusion (104) towards the respective axle (108).

B3.1. The cargo handling system (300) of paragraph B3, wherein the linear biasing mechanism (140) of each cargo-restraining device (100) of the plurality of cargo-restraining devices (100) is configured to permit linear displacement of the respective body (102) from the default deflection (202) to among a plurality of releasing deflections (208) when the force exerted on the respective body (102) exceeds a threshold.

B3.1.1. The cargo handling system (300) of paragraph B3.1, wherein the linear biasing mechanism (140) is configured to urge the body (102) from among the plurality of releasing deflections (208) when the force does not exceed the threshold.

B4. The cargo handling system (300) of any of paragraphs B1-B3.1.1, wherein the linear biasing mechanism (140) is configured to permit linear displacement of the body (102) in an outward direction from the lateral rail spacing (206).

B5. The cargo handling system (300) of any of paragraphs B1-B4, wherein the linear biasing mechanism (140) of each cargo-restraining device (100) of the plurality of cargo-restraining devices (100) is configured to permit body (102) to deflect in a longitudinal direction (211) and in an outward direction from the lateral rail spacing (206) when a force is applied to the protrusion (104) by the at least one transport structure (320) translating along the longitudinal axis (212) while body (102) is pivoted from the default pivotal position (200).

B6. The cargo handling system (300) of any of paragraphs B1-B5, wherein each cargo-restraining device (100) of the first subset (308) of cargo-restraining devices (100) is coupled to the first guide rail (304) by a respective axle (108), and each cargo-restraining device (100) of the second subset (310) of cargo-restraining devices (100) is coupled to the second guide rail (306) by a respective axle (108).

B7. The cargo handling system (300) of any of paragraphs B1-B6, wherein the cargo handling system (300) is configured to guide and restrain a plurality of transport structures (320).

B8. The cargo handling system (300) of any of paragraphs B1-B7, wherein the plurality of transport structure (320) includes, supports, or is at least one item of cargo (34).

C1. An aircraft (10) comprising:
a fuselage (20) including at least one cargo cabin (12) configured to receive and transport at least one transport structure (320); and
the cargo handling system (300) of any of paragraphs B1-B8, wherein the cargo handling system (300) is configured to guide the at least one transport structure (320) to a desired position within the at least one cargo cabin (12) and operably restrain vertical and lateral movement of the at least one transport structure (320) within the at least one cargo cabin (12).

C2. The aircraft (10) of paragraph C1, wherein the cargo handling system (300) is configured to guide a plurality of transport structures (320) to a plurality of desired positions within the at least one cargo cabin (12) and operably restrain vertical and lateral movement of the plurality of transport structures (320) within the at least one cargo cabin (12).

D. An aircraft (10) comprising:
a fuselage (20) including a cargo cabin (12) configured to receive and transport at least one transport structure (320); and
a cargo handling system (300) configured to guide the at least one transport structure (320) to a desired position within the cargo cabin (12) and operably restrain vertical and lateral movement of the at least one transport structure (320) within the cargo cabin (12), wherein the cargo handling system (300) comprises a plurality of cargo-restraining devices (100) configured to restrain vertical movement of the at least one transport structure (320), wherein each cargo-restraining device (100) comprises:
  a body (102) comprising a protrusion (104) and a defining a slot (106) extending at least partially through the body (102) transverse to the protrusion (104);
  an axle (108) slidingly received in the slot (106) and operatively coupled to a cabin floor (24) of the cargo cabin (12);
  a torsional biasing mechanism (120) engaged with the axle (108) and the body (102) and configured to bias the body (102) toward a default pivotal position (200) relative to the axle (108);
  a linear biasing mechanism (140) engaged with the axle (108) and the body (102) and configured to bias the body (102) toward a default deflection (202) relative to the axle (108); and
  wherein the slot (106) is configured to constrain linear displacement of the body (102) relative to the axle (108).

D2. The aircraft (10) of paragraph D1, wherein the cargo handling system (300) is configured to guide a plurality of transport structures (320) to a plurality of desired positions within the cargo cabin (12) and operably restrain vertical and lateral movement of the plurality of transport structures (320) within the cargo cabin (12).

E. The use of the cargo handling system (300) of any of paragraphs B1-B8 to guide at least one transport structure (320) to within a cargo cabin (12) of an aircraft (10) and operably restrain vertical and lateral movement of the at least one transport structure (320) within the cargo cabin (12).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, an object that is at least substantially formed from a material includes an object for which at least 75% of the object is formed from the material and also includes an object that is completely formed from the material. As another example, a first direction that is at least substantially parallel to a second direction includes a first direction that forms an angle with respect to the second direction that is at most 22.5 degrees and also includes a first direction that is exactly parallel to the second direction. As another example, a first length that is substantially equal to a second length includes a first length that is at least 75% of the second length, a first length that is equal to the second length, and a first length that exceeds the second length such that the second length is at least 75% of the first length.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A cargo-restraining device, comprising:
a body comprising a protrusion and defining a slot extending at least partially through the body transverse to the protrusion, wherein the slot is configured to slidingly receive an axle of an axle assembly, wherein the axle assembly is configured to operatively couple the cargo-restraining device to a guide rail of a cargo handling system, wherein the body is configured to pivot relative to the axle about a pivotal axis of the axle and to be linearly displaced relative to and transverse to the axle when the axle is operatively received in the slot, and wherein the slot is configured to constrain linear displacement of the body relative to the axle transverse to the pivotal axis when the axle is operatively received in the slot;
a torsional biasing mechanism operably engaged with the body and configured to engage with the axle assembly to bias the body toward a default pivotal position relative to the axle; and
a linear biasing mechanism comprising a linear spring that extends transverse to the pivotal axis when the axle is operatively received in the slot, and wherein the linear spring is engaged with the body and configured to operatively engage with the axle to bias the body toward a default deflection relative to the axle when the axle is operatively received in the slot.

2. The cargo-restraining device of claim 1, wherein the linear biasing mechanism is configured to restrict deflection of the body beyond a maximum threshold linear deflection when the axle is operatively received in the slot, wherein the slot has a slot length traverse to the axle when the axle is operatively received in the slot, wherein the body has an outermost length that is aligned with the slot length, wherein the maximum threshold linear deflection is a threshold fraction of the slot length, and wherein the threshold fraction of the maximum threshold linear deflection to the slot length is at least 10%.

3. The cargo-restraining device of claim 1, wherein the linear biasing mechanism is configured to apply a restoring force between the body and the axle when the axle is operatively received in the slot and when the body is displaced from the default deflection to urge the body toward the default deflection.

4. The cargo-restraining device of claim 3, wherein the linear biasing mechanism is configured to apply the restoring force between the body and the axle when the axle is operatively received in the slot, when the body is in the default pivotal position, and when the body is pivoted from the default pivotal position.

5. The cargo-restraining device of claim 1, wherein at least a portion of the linear biasing mechanism is disposed within the slot.

6. The cargo-restraining device of claim 1, wherein the linear spring is configured to apply an outward restoring force between the axle and a first end region of the slot to bias the body toward the default deflection and urge the body toward the default deflection when the axle is operatively received in the slot and when the body is displaced from the default deflection.

7. The cargo-restraining device of claim 1, wherein the linear biasing mechanism comprises an axle-contacting member configured to pivotally engage the axle and permit pivotal movement of the linear spring and the body about the axle.

8. The cargo-restraining device of claim 7, wherein the linear spring is configured to apply an outward restoring force between the axle and a first end region of the slot to bias the body toward the default deflection when the axle is operatively received in the slot, wherein the axle-contacting member is operatively coupled to the linear spring, and wherein the axle-contacting member is configured to urge the axle-contacting member into operative contact with the axle when the axle is received in the slot.

9. The cargo-restraining device of claim 7, wherein the body includes at least one linear guide disposed within the slot and extending at least substantially parallel to a slot length of the slot, wherein the axle-contacting member includes at least one guide-contacting member that is slidably engaged with the at least one linear guide, and wherein the at least one linear guide and the at least one guide-contacting member are configured to constrain the linear displacement of the body relative to the axle when the axle is operatively received in the slot.

10. The cargo-restraining device of claim 1, wherein the torsional biasing mechanism is configured to apply a torsional restoring force between the body and the axle to urge the body toward the default pivotal position when the axle is operatively received in the slot, and wherein the torsional biasing mechanism is configured to apply the torsional restoring force when the body is in the default deflection and when the body is deflected from the default deflection when the axle is operatively received in the slot.

11. A cargo handling system configured to guide and restrain at least one transport structure, the cargo handling system comprising:
   a cargo guide assembly comprising a first guide rail and a second guide rail extending at least substantially parallel to one another along a longitudinal axis, wherein the first guide rail and the second guide rail are laterally spaced apart from one another with a lateral rail spacing therebetween;
   a plurality of cargo-restraining devices, wherein each of the plurality of cargo-restraining devices comprises:
      a body comprising a protrusion and defining a slot extending at least partially through the body transverse to the protrusion;
      an axle slidingly received in the slot and operatively coupled to one of the first guide rail and the second guide rail, wherein the axle defines a pivotal axis, and wherein the body is configured to pivot relative to the axle about the pivotal axis and translate transverse to the pivotal axis;
      a torsional biasing mechanism engaged with the axle and the body and configured to bias the body toward a default pivotal position relative to the axle;
      a linear biasing mechanism engaged with the axle and the body and configured to bias the body toward a default deflection relative to the axle, wherein the linear biasing mechanism comprises a linear spring that extends transverse to the pivotal axis; and
      wherein the body is configured to be linearly displaced relative to the axle and transverse to the pivotal axis and wherein the slot is configured to constrain such linear displacement of the body relative to the axle transverse to the pivotal axis; and
   wherein a first subset of the plurality of cargo-restraining devices are operably coupled to and extend from the first guide rail and a second subset of the plurality of cargo-restraining devices are operably coupled to and extend from the second guide rail, wherein, in the default pivotal position, the protrusion of each of the first subset and the second subset of the plurality of cargo-restraining devices extends traverse to the longitudinal axis and into the lateral rail spacing.

12. The cargo handling system of claim 11, wherein the first guide rail and the second guide rail are configured to restrict lateral movement of the at least one transport structure positioned within the lateral rail spacing, wherein the plurality of cargo-restraining devices are configured to restrict vertical movement of the at least one transport structure positioned within the lateral rail spacing, and wherein the first guide rail and the second guide rail are configured to guide translation of the at least one transport structure along the longitudinal axis.

13. The cargo handling system of claim 11, wherein the linear biasing mechanism of each cargo-restraining device of the plurality of cargo-restraining devices is configured to permit linear displacement of the body in an outward direction from the lateral rail spacing.

14. The cargo handling system of claim 11, wherein the linear biasing mechanism of each cargo-restraining device of the plurality of cargo-restraining devices is configured to permit linear displacement of the body from the default deflection when a force is applied to a respective protrusion by the at least one transport structure translating along the longitudinal axis that urges the respective protrusion towards a respective axle.

15. The cargo handling system of claim 14, wherein the linear biasing mechanism of each cargo-restraining device of the plurality of cargo-restraining devices is configured to permit linear displacement of a respective body from the default deflection to among a plurality of releasing deflections when the force exerted on the respective body exceeds a threshold.

16. The cargo handling system of claim 15, wherein the linear biasing mechanism is configured to urge the body from among the plurality of releasing deflections when the force does not exceed the threshold.

17. The cargo handling system of claim 11, wherein the torsional biasing mechanism of each cargo-restraining device of the plurality of cargo-restraining devices is configured to permit pivotal displacement of the body from the default pivotal position when a torque is applied to the protrusion by the at least one transport structure translating along the longitudinal axis.

18. The cargo handling system of claim 11, wherein the linear biasing mechanism of each cargo-restraining device of the plurality of cargo-restraining devices is configured to permit the body to deflect in a longitudinal direction and in an outward direction from the lateral rail spacing when a force is applied to the protrusion by the at least one transport structure translating along the longitudinal axis while the body is pivoted from the default pivotal position.

19. An aircraft comprising:
   a fuselage including a cargo cabin configured to receive and transport at least one transport structure; and
   a cargo handling system configured to guide the at least one transport structure to a desired position within the cargo cabin and operably restrain vertical and lateral movement of the at least one transport structure within the cargo cabin, wherein the cargo handling system comprises a plurality of cargo-restraining devices configured to restrain vertical movement of the at least one transport structure, wherein each cargo-restraining device comprises:
      a body comprising a protrusion and a defining a slot extending at least partially through the body transverse to the protrusion;
      an axle slidingly received in the slot and operatively coupled to a cabin floor of the cargo cabin, wherein the axle defines a pivotal axis, and wherein the body is configured to pivot about the pivotal axis and translate transverse to the pivotal axis;
      a torsional biasing mechanism engaged with the axle and the body and configured to bias the body toward a default pivotal position relative to the axle;
      a linear biasing mechanism engaged with the axle and the body and configured to bias the body toward a default deflection relative to the axle, wherein the linear biasing mechanism comprises a linear spring that extends transverse to the pivotal axis; and
      wherein the body is configured to be linearly displaced relative to the axle and transverse to the pivotal axis and wherein the slot is configured to constrain such linear displacement of the body relative to the axle transverse to the pivotal axis.

20. The aircraft of claim 19, wherein the cargo handling system is configured to guide a plurality of transport structures to a plurality of desired positions within the cargo cabin and operably restrain vertical and lateral movement of the plurality of transport structures within the cargo cabin.

* * * * *